US007780520B2

(12) United States Patent
Baerlocher

(10) Patent No.: US 7,780,520 B2
(45) Date of Patent: Aug. 24, 2010

(54) GAMING DEVICE HAVING MULTIPLE DIFFERENT TYPES OF PROGRESSIVE AWARDS

(75) Inventor: Anthony J. Baerlocher, Reno, NV (US)

(73) Assignee: IGT, Reno, NV (US)

( * ) Notice: Subject to any disclaimer, the term of this patent is extended or adjusted under 35 U.S.C. 154(b) by 686 days.

(21) Appl. No.: 11/376,497

(22) Filed: Mar. 15, 2006

(65) Prior Publication Data

US 2007/0218982 A1 Sep. 20, 2007

(51) Int. Cl.
*A63F 13/00* (2006.01)

(52) U.S. Cl. ............................ 463/25; 463/16; 463/20; 463/27; 273/138.1; 273/139

(58) Field of Classification Search ..................... 463/1, 463/10–13, 16–21, 23, 25–27, 29–34; 273/138.1, 273/138.2, 141 A, 142 B, 142 C, 142 J, 139
See application file for complete search history.

(56) References Cited

U.S. PATENT DOCUMENTS

| | | | |
|---|---|---|---|
| 2,942,574 | A | 6/1960 | Golay |
| 3,618,019 | A | 11/1971 | Nemirovsky |
| 3,998,309 | A | 12/1976 | Mandas et al. |
| 4,072,930 | A | 2/1978 | Lucero et al. |
| 4,238,127 | A | 12/1980 | Lucero et al. |
| 4,277,064 | A | 7/1981 | Newman |
| 4,283,709 | A | 8/1981 | Lucero et al. |
| 4,335,809 | A | 6/1982 | Wain |
| 4,409,656 | A | 10/1983 | Andersen et al. |
| 4,448,419 | A | 5/1984 | Telnaes |

(Continued)

FOREIGN PATENT DOCUMENTS

| | | |
|---|---|---|
| AU | 78/39363 | 3/1980 |

(Continued)

OTHER PUBLICATIONS

Aristocrat Brochure, written by Aristocrat Gaming, published in 2004.

(Continued)

*Primary Examiner*—Peter DungBa Vo
*Assistant Examiner*—Arthur O. Hall
(74) *Attorney, Agent, or Firm*—K&L Gates LLP

(57) ABSTRACT

A gaming system including a central server linked to a plurality of gaming machines. The gaming system includes a plurality of different types of progressive awards adapted to be provided to one or more players of the gaming machines in the gaming system. In one embodiment, one or more progressive awards are each associated with a progressive hit value, wherein when each progressive award increments to its respective progressive hit value, a triggering event occurs and such progressive award is provided to a player. In one embodiment, one or more progressive awards are each associated with a secondary game, wherein if the secondary game is triggered, a player is provided either a fixed award or one of the progressive awards associated with the secondary game based on a play of the secondary game. In one embodiment, one or more progressive awards are each associated with an outcome of a primary game, such as a designated symbol combination, wherein if the associated primary game outcome is generated, such progressive award is provided to a player.

32 Claims, 12 Drawing Sheets

U.S. PATENT DOCUMENTS 4,494,197 A 1/1985 Troy et al.
4,573,681 A 3/1986 Okada
4,582,324 A 4/1986 Koza et al.
4,624,459 A 11/1986 Kaufman
4,636,951 A 1/1987 Harlick
4,652,998 A 3/1987 Koza et al.
4,657,256 A 4/1987 Okada
4,669,731 A 6/1987 Clarke
4,721,307 A 1/1988 Okada
4,743,024 A 5/1988 Helm et al.
4,760,527 A 7/1988 Sidley
4,764,666 A 8/1988 Bergeron
4,772,023 A 9/1988 Okada
4,775,155 A 10/1988 Lees
4,805,907 A 2/1989 Hagiwara
4,837,728 A * 6/1989 Barrie et al. .................. 463/27
4,842,278 A 6/1989 Markowicz
4,856,787 A 8/1989 Itkis
4,871,171 A 10/1989 Rivero
4,880,237 A 11/1989 Kishishita
4,926,327 A 5/1990 Sidley
4,964,638 A 10/1990 Ishida
4,991,848 A 2/1991 Greenwood et al.
5,016,880 A 5/1991 Berge
5,038,022 A 8/1991 Lucero
5,048,833 A 9/1991 Lamle
5,074,559 A 12/1991 Okada
5,116,055 A * 5/1992 Tracy .......................... 463/27
5,123,649 A 6/1992 Tiberio
5,127,651 A 7/1992 Okada
5,158,293 A 10/1992 Mullins
5,178,390 A 1/1993 Okada
5,209,479 A 5/1993 Nagao
5,217,224 A 6/1993 Sincock
5,249,800 A 10/1993 Hilgendorf et al.
5,259,616 A 11/1993 Bergmann
5,265,874 A 11/1993 Dickinson et al.
5,275,400 A 1/1994 Weingardt
5,276,312 A 1/1994 McCarthy
5,277,424 A 1/1994 Wilms
5,280,909 A * 1/1994 Tracy .......................... 463/27
5,282,620 A 2/1994 Keesee
5,286,023 A 2/1994 Wood
5,292,127 A 3/1994 Kelly et al.
5,321,241 A 6/1994 Craine
5,324,035 A 6/1994 Morris et al.
5,326,104 A 7/1994 Pease et al.
5,342,047 A 8/1994 Heidel et al.
5,342,049 A 8/1994 Wichinsky et al.
5,344,144 A * 9/1994 Canon ......................... 463/27
5,351,970 A 10/1994 Fioretti
5,377,993 A 1/1995 Josephs
5,380,008 A 1/1995 Mathis et al.
5,393,057 A 2/1995 Marnell, II
5,398,932 A 3/1995 Eberhardt et al.
5,401,024 A 3/1995 Simunek
5,417,430 A 5/1995 Breeding
5,423,539 A 6/1995 Nagao
5,429,361 A 7/1995 Raven et al.
5,456,465 A 10/1995 Durham
5,470,079 A 11/1995 LeStrange et al.
5,472,194 A 12/1995 Breeding et al.
5,476,259 A 12/1995 Weingardt
5,489,101 A 2/1996 Moody
5,507,489 A 4/1996 Reibel et al.
5,511,781 A 4/1996 Wood
5,524,888 A 6/1996 Heidel
5,536,016 A 7/1996 Thompson
5,544,893 A 8/1996 Jones et al.
5,547,192 A 8/1996 Ishibashi
5,560,603 A 10/1996 Seelig et al.
5,564,700 A * 10/1996 Celona ........................ 463/27
5,566,337 A 10/1996 Szymanski
5,570,885 A 11/1996 Ornstein
5,580,053 A 12/1996 Crouch
5,580,309 A 12/1996 Piechowiak et al.
5,581,011 A 12/1996 Loft
5,584,763 A 12/1996 Kelly et al.
5,601,487 A 2/1997 Oshima
5,605,506 A 2/1997 Hoorn et al.
5,611,535 A 3/1997 Tiberio
5,611,730 A 3/1997 Weiss
5,626,341 A 5/1997 Jones
5,641,050 A 6/1997 Smith et al.
5,645,486 A 7/1997 Nagao et al.
5,655,961 A 8/1997 Acres et al.
5,674,128 A 10/1997 Holch et al.
5,702,304 A 12/1997 Acres et al.
5,707,285 A 1/1998 Place et al.
5,707,286 A 1/1998 Carlson
5,722,891 A 3/1998 Inoue
5,732,948 A 3/1998 Yoseloff
5,741,183 A 4/1998 Acres et al.
5,743,800 A 4/1998 Huard et al.
5,752,882 A 5/1998 Acres et al.
5,761,647 A 6/1998 Boushy
5,762,552 A 6/1998 Vuong
5,766,076 A 6/1998 Pease et al.
5,769,716 A 6/1998 Saffari et al.
5,772,511 A 6/1998 Smeltzer
RE35,864 E 7/1998 Weingardt
5,779,545 A 7/1998 Berg et al.
5,779,547 A 7/1998 SoRelle et al.
5,779,549 A 7/1998 Walker et al.
5,788,573 A 8/1998 Baerlocher et al.
5,800,269 A 9/1998 Holch et al.
5,806,855 A 9/1998 Cherry
5,807,172 A 9/1998 Piechowiak
5,816,918 A 10/1998 Kelly et al.
5,820,459 A 10/1998 Acres et al.
5,823,874 A 10/1998 Adams
5,833,537 A 11/1998 Barrie
5,833,538 A 11/1998 Weiss
5,833,540 A 11/1998 Miodunski et al.
5,836,817 A 11/1998 Acres et al.
5,848,932 A 12/1998 Adams
5,851,011 A * 12/1998 Lott ........................... 273/292
5,851,148 A 12/1998 Brune et al.
5,851,149 A 12/1998 Xidos et al.
5,855,514 A 1/1999 Kamille
5,855,515 A 1/1999 Pease et al.
5,876,284 A 3/1999 Acres et al.
5,885,158 A 3/1999 Torango et al.
5,902,184 A 5/1999 Bennett
5,902,983 A 5/1999 Crevelt et al.
5,910,048 A 6/1999 Feinberg
5,919,088 A 7/1999 Weiss
5,941,773 A 8/1999 Harlick
5,944,606 A 8/1999 Gerow
5,947,820 A 9/1999 Morro et al.
5,947,822 A 9/1999 Weiss
5,951,011 A 9/1999 Potter et al.
5,970,143 A 10/1999 Schneier et al.
5,980,384 A 11/1999 Barrie
5,984,779 A 11/1999 Bridgeman et al.
5,989,121 A 11/1999 Sakamoto
5,993,316 A 11/1999 Coyle et al.
5,997,400 A 12/1999 Seelig et al.
6,001,016 A 12/1999 Walker et al.
6,004,207 A 12/1999 Wilson, Jr. et al.
6,007,427 A 12/1999 Wiener
6,012,982 A * 1/2000 Piechowiak et al. ........... 463/16
6,012,983 A 1/2000 Walker et al.
6,015,346 A 1/2000 Bennett

| | | | | |
|---|---|---|---|---|
| 6,030,288 | A | 2/2000 | Davis et al. | |
| 6,033,307 | A * | 3/2000 | Vancura | 463/20 |
| 6,039,648 | A | 3/2000 | Guinn et al. | |
| 6,039,649 | A | 3/2000 | Schulze | |
| 6,048,269 | A | 4/2000 | Burns et al. | |
| 6,050,895 | A | 4/2000 | Luciano et al. | |
| 6,056,642 | A | 5/2000 | Bennett | |
| 6,059,289 | A | 5/2000 | Vancura | |
| 6,068,553 | A | 5/2000 | Parker | |
| 6,077,162 | A | 6/2000 | Weiss | |
| 6,080,062 | A | 6/2000 | Olson | |
| 6,089,976 | A | 7/2000 | Schneider et al. | |
| 6,089,977 | A | 7/2000 | Bennett | |
| 6,089,978 | A | 7/2000 | Adams | |
| 6,089,980 | A | 7/2000 | Gauselmann | |
| 6,099,408 | A | 8/2000 | Schneier et al. | |
| 6,110,041 | A | 8/2000 | Walker et al. | |
| 6,110,043 | A * | 8/2000 | Olsen | 463/27 |
| 6,117,013 | A | 9/2000 | Eiba | |
| 6,135,884 | A | 10/2000 | Hedrick et al. | |
| 6,142,872 | A | 11/2000 | Walker et al. | |
| 6,146,270 | A | 11/2000 | Huard et al. | |
| 6,146,273 | A | 11/2000 | Olsen | |
| 6,149,521 | A | 11/2000 | Sanduski | |
| 6,152,823 | A | 11/2000 | Lacoste et al. | |
| 6,155,925 | A | 12/2000 | Giobbi et al. | |
| 6,159,097 | A | 12/2000 | Gura | |
| 6,159,098 | A | 12/2000 | Slomiany et al. | |
| 6,162,121 | A | 12/2000 | Morro et al. | |
| 6,162,122 | A | 12/2000 | Acres et al. | |
| 6,167,523 | A | 12/2000 | Strong | |
| 6,168,520 | B1 | 1/2001 | Baerlocher et al. | |
| 6,183,366 | B1 | 2/2001 | Goldberg et al. | |
| 6,186,894 | B1 | 2/2001 | Mayeroff | |
| 6,190,255 | B1 | 2/2001 | Thomas et al. | |
| 6,203,010 | B1 | 3/2001 | Jorasch et al. | |
| 6,203,430 | B1 | 3/2001 | Walker et al. | |
| 6,206,374 | B1 | 3/2001 | Jones | |
| 6,210,275 | B1 * | 4/2001 | Olsen | 463/16 |
| 6,210,277 | B1 | 4/2001 | Stefan | |
| 6,217,448 | B1 | 4/2001 | Olsen | |
| 6,224,482 | B1 * | 5/2001 | Bennett | 463/20 |
| 6,224,483 | B1 | 5/2001 | Mayeroff | |
| 6,224,484 | B1 * | 5/2001 | Okuda et al. | 463/27 |
| 6,231,442 | B1 | 5/2001 | Mayeroff | |
| 6,231,445 | B1 | 5/2001 | Acres | |
| 6,234,896 | B1 | 5/2001 | Walker et al. | |
| 6,238,288 | B1 | 5/2001 | Walker et al. | |
| 6,241,608 | B1 | 6/2001 | Torango | |
| 6,244,958 | B1 | 6/2001 | Acres | |
| 6,254,483 | B1 | 7/2001 | Acres | |
| 6,257,981 | B1 | 7/2001 | Acres et al. | |
| 6,264,557 | B1 | 7/2001 | Schneier et al. | |
| 6,270,409 | B1 | 8/2001 | Shuster | |
| 6,287,194 | B1 | 9/2001 | Okada et al. | |
| 6,287,202 | B1 | 9/2001 | Pascal et al. | |
| 6,293,866 | B1 | 9/2001 | Walker et al. | |
| RE37,414 | E | 10/2001 | Harlick | |
| 6,302,790 | B1 | 10/2001 | Brossard | |
| 6,302,793 | B1 | 10/2001 | Fertitta, III et al. | |
| 6,302,794 | B1 | 10/2001 | Ogawa | |
| 6,309,298 | B1 | 10/2001 | Gerow | |
| 6,309,300 | B1 | 10/2001 | Glavich | |
| 6,311,976 | B1 | 11/2001 | Yoseloff et al. | |
| 6,312,330 | B1 | 11/2001 | Jones et al. | |
| 6,312,333 | B1 | 11/2001 | Acres | |
| 6,315,662 | B1 | 11/2001 | Jorasch et al. | |
| 6,319,122 | B1 | 11/2001 | Packes, Jr. et al. | |
| 6,319,125 | B1 | 11/2001 | Acres | |
| 6,328,649 | B1 | 12/2001 | Randall et al. | |
| 6,334,814 | B1 | 1/2002 | Adams | |
| 6,336,857 | B1 | 1/2002 | McBride | |
| 6,340,158 | B2 | 1/2002 | Pierce et al. | |
| 6,346,043 | B1 | 2/2002 | Colin et al. | |
| 6,347,738 | B1 | 2/2002 | Crevelt et al. | |
| 6,347,996 | B1 | 2/2002 | Gilmore et al. | |
| 6,358,147 | B1 | 3/2002 | Jaffe et al. | |
| 6,358,149 | B1 | 3/2002 | Schneider et al. | |
| 6,361,441 | B1 | 3/2002 | Walker et al. | |
| 6,364,766 | B1 | 4/2002 | Anderson et al. | |
| 6,364,768 | B1 | 4/2002 | Acres et al. | |
| 6,364,769 | B1 | 4/2002 | Weiss et al. | |
| 6,371,852 | B1 | 4/2002 | Acres | |
| 6,375,567 | B1 | 4/2002 | Acres | |
| 6,375,568 | B1 | 4/2002 | Roffman et al. | |
| 6,375,569 | B1 | 4/2002 | Acres | |
| 6,398,218 | B1 | 6/2002 | Vancura | |
| 6,406,369 | B1 | 6/2002 | Baerlocher et al. | |
| 6,416,408 | B2 | 7/2002 | Tracy et al. | |
| 6,416,409 | B1 | 7/2002 | Jordan | |
| 6,419,579 | B1 | 7/2002 | Bennett | |
| 6,419,583 | B1 | 7/2002 | Crumby et al. | |
| 6,428,412 | B1 | 8/2002 | Anderson et al. | |
| 6,431,983 | B2 | 8/2002 | Acres | |
| 6,435,511 | B1 | 8/2002 | Vancura et al. | |
| 6,435,968 | B1 | 8/2002 | Torango | |
| 6,454,651 | B1 | 9/2002 | Yoseloff | |
| RE37,885 | E | 10/2002 | Acres et al. | |
| 6,461,241 | B1 | 10/2002 | Webb et al. | |
| 6,471,208 | B2 | 10/2002 | Yoseloff et al. | |
| 6,481,713 | B2 | 11/2002 | Perrie et al. | |
| 6,491,584 | B2 * | 12/2002 | Graham et al. | 463/25 |
| 6,511,376 | B2 | 1/2003 | Walker et al. | |
| 6,533,664 | B1 | 3/2003 | Crumby | |
| 6,537,150 | B1 | 3/2003 | Luciano et al. | |
| 6,546,134 | B1 | 4/2003 | Shrairman et al. | |
| 6,546,374 | B1 | 4/2003 | Esposito et al. | |
| 6,547,131 | B1 | 4/2003 | Foodman et al. | |
| 6,554,705 | B1 | 4/2003 | Cumbers | |
| 6,561,904 | B2 | 5/2003 | Locke et al. | |
| 6,565,434 | B1 | 5/2003 | Acres | |
| 6,569,015 | B1 | 5/2003 | Baerlocher et al. | |
| 6,572,471 | B1 | 6/2003 | Bennett | |
| 6,575,832 | B1 | 6/2003 | Manfredi et al. | |
| 6,589,115 | B2 | 7/2003 | Walker et al. | |
| 6,592,460 | B2 | 7/2003 | Torango | |
| 6,595,853 | B1 | 7/2003 | Osawa | |
| 6,599,185 | B1 | 7/2003 | Kaminkow et al. | |
| 6,599,190 | B2 | 7/2003 | Osawa | |
| 6,599,193 | B2 | 7/2003 | Baerlocher et al. | |
| 6,607,438 | B2 | 8/2003 | Baerlocher et al. | |
| 6,607,441 | B1 | 8/2003 | Acres | |
| 6,609,973 | B1 | 8/2003 | Weiss | |
| 6,620,046 | B2 | 9/2003 | Rowe | |
| 6,626,758 | B1 | 9/2003 | Parham et al. | |
| 6,634,944 | B2 | 10/2003 | Osawa | |
| 6,637,747 | B1 | 10/2003 | Garrod | |
| 6,645,074 | B2 | 11/2003 | Thomas et al. | |
| 6,645,077 | B2 | 11/2003 | Rowe | |
| 6,648,759 | B2 | 11/2003 | Vancura | |
| 6,648,762 | B2 | 11/2003 | Walker et al. | |
| 6,656,047 | B1 | 12/2003 | Tarantino et al. | |
| 6,656,048 | B2 | 12/2003 | Olsen | |
| 6,656,052 | B2 | 12/2003 | Abramopoulos et al. | |
| 6,672,959 | B2 | 1/2004 | Moody et al. | |
| 6,675,152 | B1 | 1/2004 | Prasad et al. | |
| 6,682,419 | B2 | 1/2004 | Webb et al. | |
| 6,682,420 | B2 | 1/2004 | Webb et al. | |
| 6,682,421 | B1 | 1/2004 | Rowe et al. | |
| 6,692,355 | B2 | 2/2004 | Baerlocher et al. | |
| 6,702,674 | B1 | 3/2004 | De Bruin et al. | |
| 6,712,695 | B2 | 3/2004 | Mothwurf et al. | |
| 6,712,697 | B2 | 3/2004 | Acres | |
| 6,719,630 | B1 | 4/2004 | Seelig et al. | |
| 6,733,389 | B2 | 5/2004 | Webb et al. | |
| 6,746,328 | B2 | 6/2004 | Cannon et al. | |

6,749,510 B2 6/2004 Giobbi
6,754,346 B2 6/2004 Eiserling et al.
6,761,632 B2 7/2004 Bansemer et al.
6,776,714 B2 8/2004 Ungaro et al.
6,776,715 B2 8/2004 Price
6,780,111 B2 8/2004 Cannon et al.
6,790,141 B2 9/2004 Muir
6,793,578 B2 9/2004 Luccesi et al.
6,800,030 B2 10/2004 Acres
6,805,352 B2 10/2004 Hunter
6,811,483 B1 11/2004 Webb et al.
6,832,956 B1 12/2004 Boyd et al.
6,832,958 B2 12/2004 Acres et al.
6,837,788 B2 1/2005 Cannon
6,857,958 B2 2/2005 Osawa
6,869,361 B2 3/2005 Sharpless et al.
6,887,154 B1 * 5/2005 Luciano et al. ............... 463/26
6,889,849 B2 5/2005 Heidel et al.
6,899,625 B2 5/2005 Luciano, Jr. et al.
6,908,387 B2 6/2005 Hedrick et al.
6,910,964 B2 6/2005 Acres
6,918,832 B2 7/2005 Baerlocher et al.
6,918,834 B2 7/2005 Vancura
6,932,707 B2 8/2005 Duhamel
6,935,951 B2 8/2005 Paulsen et al.
6,935,958 B2 8/2005 Nelson
6,939,234 B2 9/2005 Beatty
RE38,812 E 10/2005 Acres et al.
6,966,834 B1 11/2005 Johnson
6,981,917 B2 1/2006 Webb et al.
6,984,173 B1 1/2006 Piechowiak et al.
7,029,395 B1 4/2006 Baerlocher
7,066,814 B2 4/2006 Glavich et al.
7,037,195 B2 5/2006 Schneider et al.
7,056,215 B1 6/2006 Olive
7,144,321 B2 12/2006 Mayeroff
7,297,059 B2 * 11/2007 Vancura et al. ............... 463/27
7,510,473 B2 * 3/2009 Thomas ....................... 463/25
7,628,696 B2 * 12/2009 Gauselmann ................ 463/26
2001/0024971 A1 9/2001 Brossard
2001/0049303 A1 12/2001 Found
2001/0055990 A1 12/2001 Acres
2002/0002674 A1 1/2002 Grimes et al.
2002/0071557 A1 6/2002 Nguyen
2002/0116615 A1 8/2002 Nguyen et al.
2002/0138594 A1 9/2002 Rowe
2002/0151346 A1 * 10/2002 Devaull ....................... 463/20
2002/0152120 A1 10/2002 Howington
2002/0165023 A1 11/2002 Brosnan et al.
2002/0187834 A1 12/2002 Rowe et al.
2003/0027625 A1 2/2003 Rowe
2003/0027630 A1 2/2003 Kelly et al.
2003/0028779 A1 2/2003 Rowe
2003/0045350 A1 3/2003 Baerlocher et al.
2003/0045353 A1 3/2003 Paulsen et al.
2003/0050111 A1 3/2003 Saffari
2003/0054878 A1 3/2003 Benoy et al.
2003/0060266 A1 3/2003 Baerlocher
2003/0060269 A1 3/2003 Paulsen et al.
2003/0060279 A1 3/2003 Torango
2003/0083121 A1 * 5/2003 Cole et al. .................... 463/16
2003/0083943 A1 5/2003 Adams et al.
2003/0092484 A1 5/2003 Schneider et al.
2003/0100361 A1 5/2003 Sharpless et al.
2003/0144965 A1 7/2003 Prasad et al.
2003/0146574 A1 * 8/2003 Duhamel .................... 273/292
2003/0182574 A1 9/2003 Whitten et al.
2003/0199321 A1 10/2003 Williams
2003/0211879 A1 11/2003 Englman
2003/0222402 A1 12/2003 Olive
2003/0223803 A1 12/2003 De Schrijver
2003/0228901 A1 * 12/2003 Walker et al. ................. 463/25
2003/0228904 A1 12/2003 Acres et al.
2003/0232647 A1 12/2003 Moser
2004/0009811 A1 1/2004 Torango
2004/0053660 A1 3/2004 Webb et al.
2004/0072615 A1 4/2004 Maya et al.
2004/0087368 A1 5/2004 Gavselmann
2004/0219962 A1 11/2004 Vancura
2004/0235552 A1 * 11/2004 Gauselmann ................ 463/16
2004/0242297 A1 12/2004 Walker
2004/0242320 A1 * 12/2004 Jackson ....................... 463/26
2005/0012818 A1 1/2005 Kiely et al.
2005/0026694 A1 2/2005 Kelly et al.
2005/0032573 A1 2/2005 Acres et al.
2005/0053467 A1 3/2005 Ackerman et al.
2005/0055113 A1 * 3/2005 Gauselmann ................ 700/91
2005/0070353 A1 3/2005 Webb et al.
2005/0070356 A1 3/2005 Mothwurf
2005/0079908 A1 4/2005 Pacey
2005/0079911 A1 4/2005 Nakatsu
2005/0086478 A1 4/2005 Peinado et al.
2005/0096125 A1 5/2005 LeMay et al.
2005/0101374 A1 5/2005 Acres
2005/0101375 A1 5/2005 Webb et al.
2005/0101384 A1 5/2005 Parham
2005/0119047 A1 6/2005 Olive
2005/0143168 A1 6/2005 Torango
2005/0143169 A1 6/2005 Nguyen et al.
2005/0148383 A1 7/2005 Mayeroff
2005/0159211 A1 7/2005 Englman
2005/0163377 A1 7/2005 Walch
2005/0164764 A1 7/2005 Ghaly
2005/0176488 A1 8/2005 Olive
2005/0178716 A1 8/2005 Suri
2005/0192083 A1 9/2005 Iwamoto
2005/0192099 A1 9/2005 Nguyen et al.
2005/0209004 A1 9/2005 Torango
2005/0215313 A1 * 9/2005 O'Halloran .................. 463/26
2005/0239542 A1 * 10/2005 Olsen .......................... 463/27
2005/0267610 A1 12/2005 Shinoda
2005/0282626 A1 12/2005 Manfredi et al.
2005/0282629 A1 12/2005 Gagner
2006/0003829 A1 1/2006 Thomas
2006/0009285 A1 1/2006 Pryzby et al.
2006/0025210 A1 2/2006 Johnson
2006/0026604 A1 2/2006 Tan et al.
2006/0030397 A1 2/2006 Chan
2006/0030403 A1 2/2006 Lafky et al.
2006/0035694 A1 2/2006 Fuller
2006/0035705 A1 2/2006 Jordan et al.
2006/0035706 A1 2/2006 Thomas et al.
2006/0036552 A1 2/2006 Gunyakti et al.
2006/0040723 A1 2/2006 Baerlocher et al.
2006/0040732 A1 2/2006 Baerlocher et al.
2006/0046822 A1 3/2006 Kaminkow et al.
2006/0052159 A1 3/2006 Cahill et al.
2006/0052161 A1 3/2006 Soukup et al.
2006/0052162 A1 3/2006 Soukup et al.
2006/0068897 A1 3/2006 Sanford et al.
2006/0073887 A1 4/2006 Nguyen et al.
2006/0073889 A1 4/2006 Edidin et al.
2006/0073897 A1 4/2006 Englman et al.
2006/0073872 A1 6/2006 Glavich et al.
2006/0119043 A1 * 6/2006 O'Halloran ................. 273/292
2006/0154718 A1 * 7/2006 Willyard et al. ............... 463/25
2006/0183537 A1 8/2006 Dickerson
2006/0183538 A1 8/2006 Michaelson et al.
2006/0287077 A1 12/2006 Grav et al.
2007/0213114 A1 * 9/2007 Caspers et al. ................ 463/16
2007/0259711 A1 * 11/2007 Thomas ....................... 463/22
2008/0015012 A1 * 1/2008 Englman et al. .............. 463/25

FOREIGN PATENT DOCUMENTS

AU 81/66683 8/1981

| | | |
|---|---|---|
| AU | 524709 | 9/1982 |
| AU | 84/25946 | 2/1985 |
| AU | 555905 | 10/1986 |
| AU | 567001 | 11/1987 |
| AU | 585160 | 6/1989 |
| AU | 630112 | 9/1989 |
| AU | 589158 | 10/1989 |
| AU | 593059 | 2/1990 |
| AU | 628330 | 9/1992 |
| AU | 633469 | 1/1993 |
| AU | 667210 | 2/1993 |
| AU | 680920 | 2/1994 |
| AU | 649009 | 5/1994 |
| AU | 94/71515 | 8/1994 |
| AU | 655801 | 1/1995 |
| AU | 709724 | 2/1997 |
| AU | 96/69806 | 6/1997 |
| AU | 96/69807 | 6/1997 |
| AU | PO 7780 | 7/1997 |
| AU | PO 9090 | 9/1997 |
| AU | 733599 | 10/1997 |
| AU | 97/45197 | 1/1998 |
| AU | 96/62115 | 2/1998 |
| AU | 97/45403 | 6/1998 |
| AU | 97/24645 | 7/1998 |
| AU | 97/43615 | 7/1998 |
| AU | 755826 | 8/1998 |
| AU | 98/74161 | 9/1998 |
| AU | 98/63553 | 10/1998 |
| AU | 98/63716 | 11/1998 |
| AU | 98/84162 | 3/1999 |
| AU | 98/87937 | 3/1999 |
| AU | 99/10969 | 5/1999 |
| AU | 707687 | 7/1999 |
| AU | 714299 | 8/1999 |
| AU | 99/17318 | 9/1999 |
| AU | 768285 | 9/1999 |
| AU | 711501 | 10/1999 |
| AU | 746082 | 10/1999 |
| AU | 756180 | 10/1999 |
| AU | 753102 | 11/1999 |
| AU | 765084 | 11/1999 |
| AU | 760617 | 1/2000 |
| AU | 716299 | 2/2000 |
| AU | 721968 | 7/2000 |
| AU | 722107 | 7/2000 |
| AU | 728788 | 1/2001 |
| AU | 744569 | 3/2001 |
| AU | 771847 | 3/2001 |
| AU | 2001 100032 | 11/2001 |
| AU | 2001 100033 | 11/2001 |
| AU | 748263 | 5/2002 |
| AU | 749222 | 6/2002 |
| AU | 754689 | 11/2002 |
| AU | 758306 | 3/2003 |
| DE | 3415114 | 11/1985 |
| DE | 3917683 | 12/1990 |
| DE | 4200254 | 8/1993 |
| EP | 0 342 797 | 11/1989 |
| EP | 0 444 932 | 2/1991 |
| EP | 0 420 586 | 4/1991 |
| EP | 0 433 420 | 1/1995 |
| EP | 0 798 676 | 10/1997 |
| EP | 0 874 337 | 10/1998 |
| EP | 0 952 563 | 2/1999 |
| EP | 0 926 645 | 6/1999 |
| EP | 0 944 030 | 9/1999 |
| EP | 1 637 196 | 9/2004 |
| EP | 1 467 329 | 10/2004 |
| EP | 1 498 860 | 1/2005 |
| EP | 1 513 114 | 3/2005 |
| EP | 1 528 516 | 5/2005 |
| EP | 1 528 517 | 5/2005 |
| GB | 2 151 054 | 10/1983 |
| GB | 2118445 | 11/1983 |
| GB | 2 142 457 | 6/1984 |
| GB | 2 137 392 | 10/1984 |
| GB | 2 139 390 | 11/1984 |
| GB | 2 147 773 | 5/1985 |
| GB | 2 148 135 | 5/1985 |
| GB | 2 153 572 | 8/1985 |
| GB | 2231189 | 11/1990 |
| GB | 2 282 690 | 4/1995 |
| GB | 2 328 311 | 2/1999 |
| GB | 2 387 703 | 10/2003 |
| JP | 7148307 | 6/1995 |
| WO | WO 94 12256 | 6/1994 |
| WO | WO 95 22811 | 8/1995 |
| WO | WO 95 30944 | 11/1995 |
| WO | WO 96 12262 | 4/1996 |
| WO | WO 96 24421 | 8/1996 |
| WO | WO 97 12338 | 4/1997 |
| WO | WO 97 27568 | 7/1997 |
| WO | WO 98 35309 | 8/1998 |
| WO | WO 98 47115 | 10/1998 |
| WO | WO 98 51384 | 11/1998 |
| WO | WO 99 03078 | 1/1999 |
| WO | WO 99 10849 | 3/1999 |
| WO | WO 99 60498 | 11/1999 |
| WO | WO 00 12186 | 3/2000 |
| WO | WO 00 32286 | 6/2000 |
| WO | WO 01 10523 | 2/2001 |
| WO | WO 01 15055 | 3/2001 |
| WO | WO 01 15790 | 3/2001 |
| WO | WO 03 030066 | 4/2003 |
| WO | WO 03 063019 | 7/2003 |
| WO | WO 03 075235 | 9/2003 |
| WO | WO 2004 035161 | 4/2004 |
| WO | WO 2004 066061 | 8/2004 |
| WO | WO 2005 027058 | 3/2005 |
| WO | WO 2005 076193 | 8/2005 |
| WO | WO 2005 081623 | 9/2005 |
| WO | WO 2005 083599 | 9/2005 |
| WO | WO 2005 099425 | 10/2005 |
| WO | WO 2005 099845 | 10/2005 |
| WO | WO 2005 106702 | 11/2005 |
| WO | WO 2005 113093 | 12/2005 |
| WO | WO 2006 014770 | 2/2006 |
| WO | WO 2006 014833 | 2/2006 |
| WO | WO 2006 039366 | 4/2006 |

OTHER PUBLICATIONS

Aristocrat Buyer's Guide with ACES Ad, 2pp. (Mar.-May 1989).

Atronic Systems Progressive Products at G2E, published by Atronic in 2004, printed from ForRelease.com.

Auction Fever Advertisement, written by Sierra Design Group, available prior to 2004.

Bally Slot Machines Electro-Mechanicals 1964-1980 Book [in Part], Revised 3rd Edition written by Marshall Fey.

Believe it or Not Article, written by Strictly Slots, published in 2001.

Bingo Advertisement and Jackpot Bingo Advertisements, written by Casino Data Systems, published in 1998 and 2001.

Bonus Spin Diamond Fives Advertisement, written by IGT, published in 1999.

Bonus Times Article, written by Strictly Slots, published in Jul. 2000.

Cash Box Advertisement, written by Anchor Games, published in 2000.

Cash Express Advertisements, written by Aristocrat, published in 2002.

Catalogue of Champions Advertisement, written by Aristocrat, published in 1990.

Computa Game Equipment Manual written and compiled by Russell Campbell, Sep. 1990.

Computa Game, "The Software Manual", Revision 3 for Computa Game Software Version 2.41 written by Clive Davis et al., published by Computa Game Pty Ltd., Jul. 1991.
Double Spin Five Times Pay Advertisement, written by IGT, published prior to 2000.
Excerpt from Local Area Electronic Gaming Machine Communications Protocol, QCOM Version 1.5, by Queensland Treasury Office of Gaming Regulation printed Feb. 26, 1998.
Fast Buck Systems Manual, written by International Game Technology, available to Mirage shift supervisors at least as early as May 30, 1990.
Federal Court of Australia, Jupiter's Ltd v. Neurizon Pty Ltd [2005] FCAFC 90 (including description of Activadata gaming system), dated May 26, 2005.
Federal Court of Australia, Neurizon Pty Ltd v. Jupiter's Ltd [2004] FCA1012 (including description of Activdata gaming system), dated Oct. 21, 2004.
Federal Court of Australia, Neurizon Pty Ltd. v. Lth Consulting and Marketing Services Pty. Ltd. [2002] FCA 1547 (including description of Mega Gold System), dated Dec. 13, 2002.
Full House Advertisement, written by Anchor Games, published in 2000.
Gold Fever Advertisement and Game Description written Casino Data System, published in 1997.
Good Times Vision Series Advertisement, written by IGT, published in 1999.
Integrated Real Time On-Line Slot System-SDI, written by Grips Electronic GmbH, printed from website reported as archived on Feb. 20, 1997 (available at http://web.archive.org/web/19970220165559/www.grips.com/sdi.htm).
Jackpot Carnival Hyperlink Advertisement, written by Aristocrat, published prior to 2002.
Jewel in the Crown Advertisement, written by IGT, published in 2000.
Lemons, Cherries and Bell-Fruit-Gum, pp. 1 to 4 and 304 to 314, written by Bueschel, published in Royal Bell Books in Nov. 1995.
Mega Multiplier®, printed from www.wmsgaming.com, on May 22, 2001.
Mikohn Product Catalog, Chapters 1, 2, 6, 7 and 8, written by Mikohn, published in Jan. 1993.
Mikohn Supper Controller Manual, Chapters 1 to 3 and 6 to 7, written by Mikohn, published in 1989.
Millioni$er articles, written by Strictly Slots, published in Sep. 2003 and Mar. 2004.
Money Time advertisement, written by Mikohn Gaming, published in 1999.
M-Slot Series Primary Reel Product description from Lemons, Cherries and Bell-Fruit-Gum, written by Richard M. Bueschel, published in 1995.
PEM—Precision Electronic Meter, written by GRIPS Electronic GmbH, printed from website reported as archived on Feb. 20, 1997 (available at http://web.archive.org/web/19970220165753/www.grips.com/pem.htrn).
Player Tracking on Slots, written by GRIPS Electronic GmbH, printed from website reported as archived on Feb. 20, 1997 (available at http://web.archive.org/web/19970220165921/www.grips.com/playtrac.htm).
ProLINK Progressive Controller User/Reference Manual, written by Casino Data Systems, published in Apr. 1997.
Slot Line Progressive Advertisement, written by IGT, published in 1993.
Slot Line Progressive Advertisement, written by IGT, published in 1994.
Slot Line Progressive Advertisement, written by IGT, published in 1995.
Slot Line Progressive Mega Jackpots Advertisement, written by IGT, published in 1997.
Slot Line Temperature Rising Game Description, written by IGT, published in 1998.
Slot Machines A Pictorial History of the First 100 Years (pp. 216, 242 to 243), 5th edition, written by Marshall Fey, published in 1983-1997.
Super Cherry Advertisement, written by IGT, published in 2001.
Surprize Software Specification for MV2030-var 01, written by Aristocrat Leisure Industries, Australia, published prior to 2004.
Take Your Pick Article, written by Strictly Slots, published in Mar. 2001.
Wide Area Progressive Link System, written by GRIPS Electronic GmbH, printed from website reported as archived on Feb. 20, 1997 (available at http://web.archive.org/web/19970220165457/www.grips.com/wap.htm).
Zorro Advertisement, written by Aristocrat, published in 2004.
Aristocrat Technologies Australia Pty. Ltd. v. IGT (Australia) (2007) FCA 37, dated Feb. 7, 2007.
Boom Advertisement, written by Wms Gaming, Inc., published in 1998.
Cartoon Jackpots description printed from www ballygaming.com/home.asp. on Feb. 4, 2005.
Penguin Pucks article, written by Note in Gaming Marketplace, published prior to 2004.
Progressive Jackpot System article, printed from casinomagazine.comnanagearticle.asp@c_290&a=518, on Jun. 21, 2004.

* cited by examiner

GAMING DEVICE HAVING MULTIPLE DIFFERENT TYPES OF PROGRESSIVE AWARDS

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND

Gaming machines which provide players awards in primary or base games are well known. Gaming machines generally require the player to place or make a wager to activate the primary or base game. In many of these gaming machines, the award is based on the player obtaining a winning symbol or symbol combination and on the amount of the wager (e.g., the higher the wager, the higher the award). Symbols or symbol combinations which are less likely to occur usually provide higher awards.

In such known gaming machines, the amount of the wager made on the base game by the player may vary. For instance, the gaming machine may enable the player to wager a minimum number of credits, such as one credit (e.g., one cent, nickel, dime, quarter or dollar) up to a maximum number of credits, such as five credits. This wager may be made by the player a single time or multiple times in a single play of the primary game. For instance, a slot game may have one or more paylines and the slot game may enable the player to make a wager on each payline in a single play of the primary game. Thus, it is known that a gaming machine, such as a slot game, may enable players to make wagers of substantially different amounts on each play of the primary or base game ranging, for example, from one credit up to 125 credits (e.g., five credits on each of 25 separate paylines). This is also true for other wagering games, such as video draw poker, where players can wager one or more credits on each hand and where multiple hands can be played simultaneously. Accordingly, it should be appreciated that different players play at substantially different wagering amounts or levels and at substantially different rates of play.

Secondary or bonus games are also known in gaming machines. The secondary or bonus games usually provide an additional award to the player. Secondary or bonus games usually do not require an additional wager by the player to be activated. Secondary or bonus games are generally activated or triggered upon an occurrence of a designated triggering symbol or triggering symbol combination in the primary or base game. For instance, a bonus symbol occurring on the payline on the third reel of a three reel slot machine may trigger the secondary bonus game. When a secondary or bonus game is triggered, the gaming machines generally indicates this to the player through one or more visual and/or audio output devices, such as the reels, lights, speakers, video screens, etc. Part of the enjoyment and excitement of playing certain gaming machines is the occurrence or triggering of the secondary or bonus game (even before the player knows how much the bonus award will be). In other words, obtaining a bonus event and a bonus award in the bonus event is part of the enjoyment and excitement for players.

Progressive awards associated with gaming machines are also known. A progressive award is an award amount which includes an initial amount funded by a casino and an additional amount funded through a portion of each wager made on the progressive gaming machine. For example, 0.1% of each wager placed on the primary game of the gaming machine may be allocated to the progressive award or progressive award fund. The progressive award grows in value as more players play the gaming machine and more portions of the players' wagers are allocated to the progressive award. When a player obtains a winning symbol or symbol combination which results in the progressive award, the accumulated progressive award is provided to the player. After the progressive award is provided to the player, the amount of the next progressive award is reset to the initial value and a portion of each subsequent wager is allocated to the next progressive award.

A progressive award may be associated with a single gaming machine or multiple gaming machines which each contribute portions of the progressive award. The multiple gaming machines may be in the same bank of machines, in the same casino or gaming establishment (usually through a local area network ("LAN")) or in two or more different casinos or gaming establishments (usually through a wide area network ("WAN")). Such progressive awards are sometimes called local area progressives ("LAP") and wide area progressives ("WAP"), respectively.

Mystery bonus awards are also known. For instance, U.S. Pat. Nos. 5,655,961, 5,702,304, 5,741,183, 5,752,882, 5,820,459, 5,836,817, 5,876,284, 6,162,122, 6,257,981, 6,319,125, 6,364,768, 6,375,569, 6,375,567, RE37,885 and 6,565,434 describe mystery bonus awards and certain methods for providing such awards to players. Such bonus awards are classified as mystery awards because they are not based on any generated symbol or symbol combination nor is it readily apparent to the player why such bonus award(s) are provided. These patents also describe certain methods for determining which gaming machines will provide the awards to players. These patents further describe methods for a central server to determine which gaming machines will provide the bonus awards and the amounts of the bonus awards.

PCT Application No. PCT/AU98/00525, entitled "Slot Machine Game And System With Improved Jackpot Feature" discloses a jackpot awardable to a plurality of gaming machines connected to a network. Upon each play of each gaming machine, a jackpot controller increments the value of the jackpot. Prior to each primary game, the gaming machine selects a random number from a range of numbers and during each primary game, the gaming machine allocates the first N numbers in the range, where N is the number of credits bet by the player in that primary game. At the end of the primary game, the randomly selected number is compared with the numbers allocated to the player and if a match occurs, that particular gaming machine is switched into a feature game mode in which a jackpot game is played for all or part of the incremental jackpot.

More specifically, for every game that is played, a random trigger value is selected in the preprogrammed range as determined from an average number of credits wagered per jackpot. When the primary game is commenced, it is then reported to the controller, which allocates a contribution to the prize pool. Each game is also allotted numbers from the same number range from which the random number was selected, one number in the range being allotted for each credit bet such that the player's probability of being awarded the jackpot game is proportional to the bet. The previously selected random number is then used as a trigger value and compared with the values allotted to the player, if there is a match between the trigger value and the player values, the player is given an opportunity to play the jackpot game. Alternatively, a number is allocated which is equal to, or proportional to the number of credits bet in the respective primary game, the trigger value is compared with the single player value and a jackpot game awarded if the trigger value is less than or equal to the player value.

In one embodiment of the system disclosed in PCT Application No. PCT/AU98/00525, a prize is always awarded in the jackpot game. The jackpot game is used to determine the size of the prize to be awarded. The winning machine is then locked up and the controller awaits an indication that the prize has been paid before enabling the machine to be unlocked. The machine then returns to commence a new primary game. If the trigger value does not match, then there is no feature game awarded for that bought game and the machine returns to step and waits for the next game to commence.

PCT Application No. PCT/AU99/01059, entitled "Player Information Delivery" discloses a gaming console in which an animated character occasionally randomly appears and awards a player a variable random bonus prize. The occurrence of the animated character is weighted by the desired hit rate of the feature and is dependent upon the player's bet and may or may not be dependent upon the size and type of the player's bet. Additionally, the gaming console includes a bonus pool (funded by the player) and a random decision is made whether the contents of the bonus pool will be awarded in addition to any other win.

U.S. Pat. No. 6,241,608 B1 entitled "Progressive Wagering System" discloses a linked progressive wagering system that is capable of accepting wagers in different currencies and different denominations of the same currency. The system periodically computes each current prize value using the data acquired from each gaming device and displays the current prize value at each location where participating gaming devices are located (in the currency used at each particular location). This patent also discloses the system specifying a boundary criteria, such as a maximum value or an expiration date and time, for a progressive award prize. If a gaming device has not randomly generated a prize award event when the specified boundary criteria is met, a progressive award prize is forced by the system upon one or more randomly selected participating players.

While such mystery progressives are popular amongst players, a number of problems exist with these known mystery progressive systems. First, only one person wins the progressive award. This may discourage the other players who have also been playing for a long period of time. Such discouragement can lead to players walking away with jackpot fatigue. Jackpot fatigue can occur when a player no longer finds an award desirable or worth the cost of continuing to play. This desire to quit playing is also due to the fact that a player may feel they must wait a substantial period of time for the jackpot to climb back to a high value. That is, when a progressive award is provided at a different gaming machine, a player may feel deflated and not wish to continue playing for a base or reset level progressive award.

Additionally, because the mathematics and funding required to maintain the mystery progressives at levels desirable to the player, such mystery progressives are often won or hit infrequently.

There is a continuing need to provide new and different gaming machines and gaming systems as well as new and different ways to provide awards to players including bonus awards.

SUMMARY

In one embodiment, the gaming system includes a central server or controller in communication with or linked to a plurality of gaming machines or gaming devices. In another embodiment, the gaming system includes a plurality of linked gaming machines wherein one of the gaming machines functions as the central server or controller.

In one embodiment, the gaming system includes a plurality of different types of progressive awards adapted to be provided to one or more players of the gaming machines in the gaming system. In one embodiment, the plurality of progressive awards are independent from each other. In various embodiments, a plurality or each of the progressive awards start at different award levels and increment at different rates or based on different incrementing events. In one embodiment, the different progressive awards are provided to the players based on different triggering events or qualifying conditions or criteria. In this embodiment, the different triggering events or qualifying conditions provides that the different progressive awards are each triggered, on average, at different times. It should be appreciated that since the different progressive awards are provided based on different triggering events, a player may obtain a plurality of different progressive awards based on a single play of the game. Accordingly, providing a gaming system with a plurality of different triggering events for a plurality of different progressive awards significantly increases the probability that at least one incremented progressive award will be viewed as desirable to the player and will be available at any time, thus increasing the level of players interest in the gaming system disclosed herein.

In one embodiment, each individual gaming device in the gaming system includes a plurality of different types of independent progressive awards adapted to be provided to one or more players of that gaming device. In one embodiment, the different types of progressive awards are provided to the player based on the occurrences of different independent triggering events. In one embodiment, one or more progressive awards are each associated with a progressive hit value, wherein when each progressive award increments to its respective progressive hit value, a triggering event occurs and such progressive award is provided to a player. In another embodiment, the progressive hit values for one or more progressive awards are each associated with a coin-in determination as opposed to an actual monetary value. In one embodiment, one or more progressive awards are each associated with a secondary game, wherein if the secondary game is randomly triggered, a player is provided either a fixed award or one of the progressive awards associated with the secondary game based on a play of the secondary game. In one embodiment, one or more progressive awards are each associated with an outcome of a play of a primary game, such as a designated symbol combination, wherein if the associated primary game outcome is generated, such progressive award is provided to a player.

In one embodiment, one or more progressive awards maintained by the central controller are each associated with a separate range of values. In this embodiment, a triggering event will occur and one of the progressive awards will be provided to a player of a gaming device in the gaming system when that progressive award increments or increases to a value (i.e., the progressive hit value) within the range of values associated with that progressive award. For example, a first progressive award is associated with a value range of $10 to $100 and a second progressive award is associated with a value range of $100 to $1,000. In this example, a triggering event will occur and the first progressive award will be provided to a player when the value of the first progressive award increments to a first progressive hit value of $54.65. In this example, another triggering event will occur and the second progressive award will be provided to a player when the value of the second progressive award increments to a second progressive hit value of $765.71. It should be appreciated that in this embodiment, the amount which each progressive award may be incremented to is capped or limited by the highest value in the value range associated with such progressive award. In an alternative embodiment, the controller utilizes an associated coin-in value to determine when the progressive has reached the set value. Such a coin-in value is determined by using the hit value, the percentage applied to the progressive and the wager value.

In one embodiment, one or more progressive awards maintained by the central controller are each associated with a secondary game. In one embodiment, the secondary game includes an award generator, such as a wheel or reel, which determines or displays whether the player will be provided a progressive award or a fixed award in the secondary game. In one embodiment, the award generator is divided into a plurality of sections. Each section includes or is associated with one of a plurality of different awards, wherein each progressive award associated with the secondary game is associated with at least one of the sections of the award generator and one, more or each of the remaining sections of the award generator are each associated with a fixed award, such as a fixed value or a fixed multiplier. For example, if two progressive awards are associated with the secondary game, then one of the sections of the award generator is associated with the first progressive award, another section of the award generator is associated with the second progressive award and one, more or each of the remaining sections of the award generator are each associated with a fixed award. In this embodiment, if the secondary game is randomly triggered to provide a player a chance at winning one of the progressive awards in the secondary game, that gaming device activates the award generator. The activated award generator indicates one of the awards associated with the award generator and the indicated award is provided to the player. In one embodiment, as described further below, the progressive award(s) and the fixed award(s) associated with the award generator are funded via one or more side bets, wherein the player must place the appropriate side bet to be eligible to play the secondary game. It should be appreciated that in this embodiment, the chances of a player winning one of these progressive awards is based on: (i) the probability that the gaming device will trigger or initiate a secondary game (for a chance to win a progressive award); and (ii) the probability that the award generator will generate a progressive award in the triggered secondary game. That is, since the chance of a player winning a progressive award in this embodiment is based on two separate random generations, the amount which each progressive award may be incremented to is not capped or limited and thus may grow to large, desirable levels. The combination of these multiple probabilities and the presence of fixed awards enables, in one embodiment, the gaming system to trigger the award generator, such as an award wheel more often than the progressives associated with the secondary game are awarded to players. Such triggering of the award generator more often than the progressives are awarded helps maintain and enhance player excitement.

In one embodiment, one or more progressive awards maintained by the gaming system are provided to a player based on a displayed event in a play of a primary game of one of the gaming devices in the gaming system. In one embodiment, the determination of when to provide such a progressive award is based on a symbol driven event, such as the generation of one or more designated symbols or symbol combinations in a play of the primary game. In this embodiment, since the chance of winning such a progressive award is randomly determined based on a probability calculation and the progressive is funded by the player's bets, the amount which this progressive award may be incremented to is not capped or limited and thus may grow to large, desirable levels.

In one embodiment, one or more of the progressive awards are each funded via a side bet or side wager. In this embodiment, a player must place or wager a side bet to be eligible to win the progressive award associated with the side bet. In one embodiment, the player must place the maximum bet and the side bet to be eligible to win one of the progressive awards. In another embodiment, if the player places or wagers the required side bet, the player may wager at any credit amount on any payline (i.e., the player need not place the maximum bet and the side bet to be eligible to win one of the progressive awards). In one such embodiment, the greater the player's wager (in addition to the placed side bet), the greater the odds or probability that the player will win one of the progressive awards. For example, if Player A wagers ten credits per payline (in addition to a side bet of two credits) and Player B wagers one credit per payline (in addition to a side bet of two credits), both players have a chance of winning the progressive award. However, in this example, Player A has a ten times greater chance of winning the progressive award than Player B. It should be appreciated that one or more of the progressive awards may each be funded, at least in part, based on the wagers placed on the primary games of the gaming machines in the gaming system, via a gaming establishment or via any suitable manner.

In one embodiment, as described above, one, more or each of the progressive awards are maintained by the central controller of the gaming system. In another embodiment, one, more or each of the progressive awards are maintained by the individual gaming devices. For example, the progressive award(s) provided upon a symbol driven event may be maintained by the central controller (and thus obtainable by any player at any gaming device in the gaming system) while the progressive awards associated with the ranges of values and the progressive awards associated with the secondary game may be maintained by each individual gaming device (and thus obtainable by the player playing that individual gaming device). It should be appreciated that any suitable configuration of maintaining one, more or each of the progressive awards may be implemented in accordance with the gaming system disclosed herein.

Accordingly, an advantage of the gaming system and method disclosed herein is to provide a gaming system and method having a plurality of gaming devices wherein a plurality of progressive awards may be provided to one or more players either sequentially, simultaneously or substantially simultaneously. Maintaining a plurality of progressive awards provides for more frequent wins of the progressive awards which breaks up the relatively long periods of time it often takes to build the progressives to the appropriate levels desirable by a player. Providing a plurality of different types of progressive awards which are triggered or hit at different times or based on different and/or independent triggering events results in always or almost always having at least one progressive award available that is incremented to desirable levels. Providing different types of progressive awards which have different frequencies of being hit therefore provides increased enjoyment and excitement for players.

Another advantage of the gaming system and method disclosed herein is to provide a gaming system and method having a plurality of progressive awards which have different characteristics, such as capped progressive awards and non-capped progressive awards. Such a configuration increases enjoyment and excitement for the player by providing a relatively high hit frequency of the capped or ranged progressive awards while also maintaining the draw of the non-capped progressive awards as they increment to relatively higher award levels and frequently set award level records.

Another advantage of the gaming system and method disclosed herein is to provide a gaming system and method having a plurality of progressive awards wherein one or more progressive awards require a maximum wager to be eligible to win such progressive awards and one or more progressive awards do not require a maximum wager to be eligible to win such progressive awards. Such a configuration appeals to both players who prefer to place the maximum wager to win relatively larger, less frequently hit progressive awards and players who prefer not to place the maximum wager but still want to win one or more relatively smaller, more frequently hit progressive awards.

Another advantage of the gaming system and method disclosed herein is to provide a gaming system and method wherein an award generator, such as a mechanical device, is utilized to select a progressive award from a plurality of progressive awards.

Additional features and advantages are described in, and will be apparent from, the following Detailed Description and the figures.

DETAILED DESCRIPTION

Figure 1A:
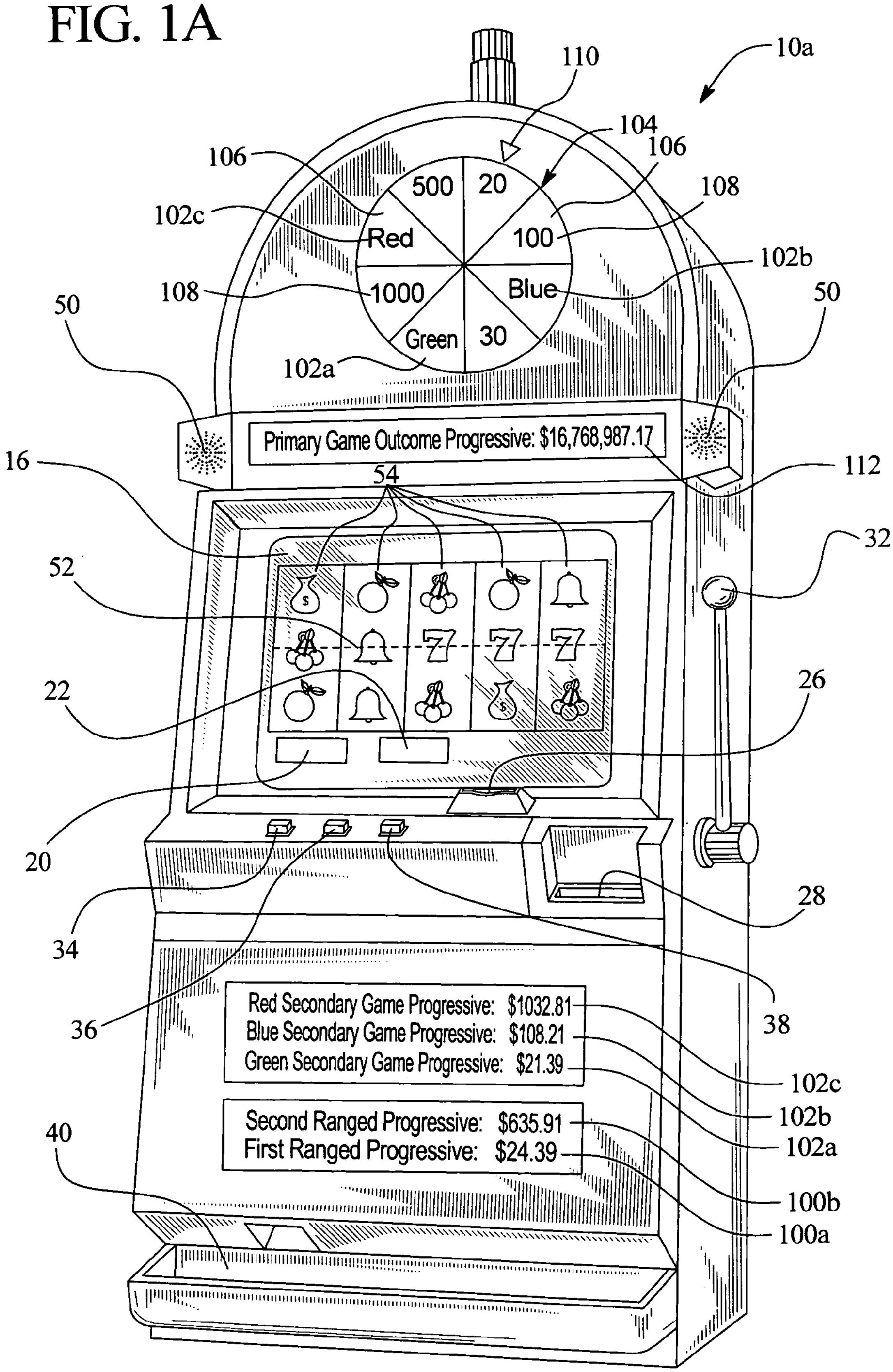
FIG. 1A is a front-side perspective view of one embodiment of the gaming device disclosed herein.
Figure 1B:
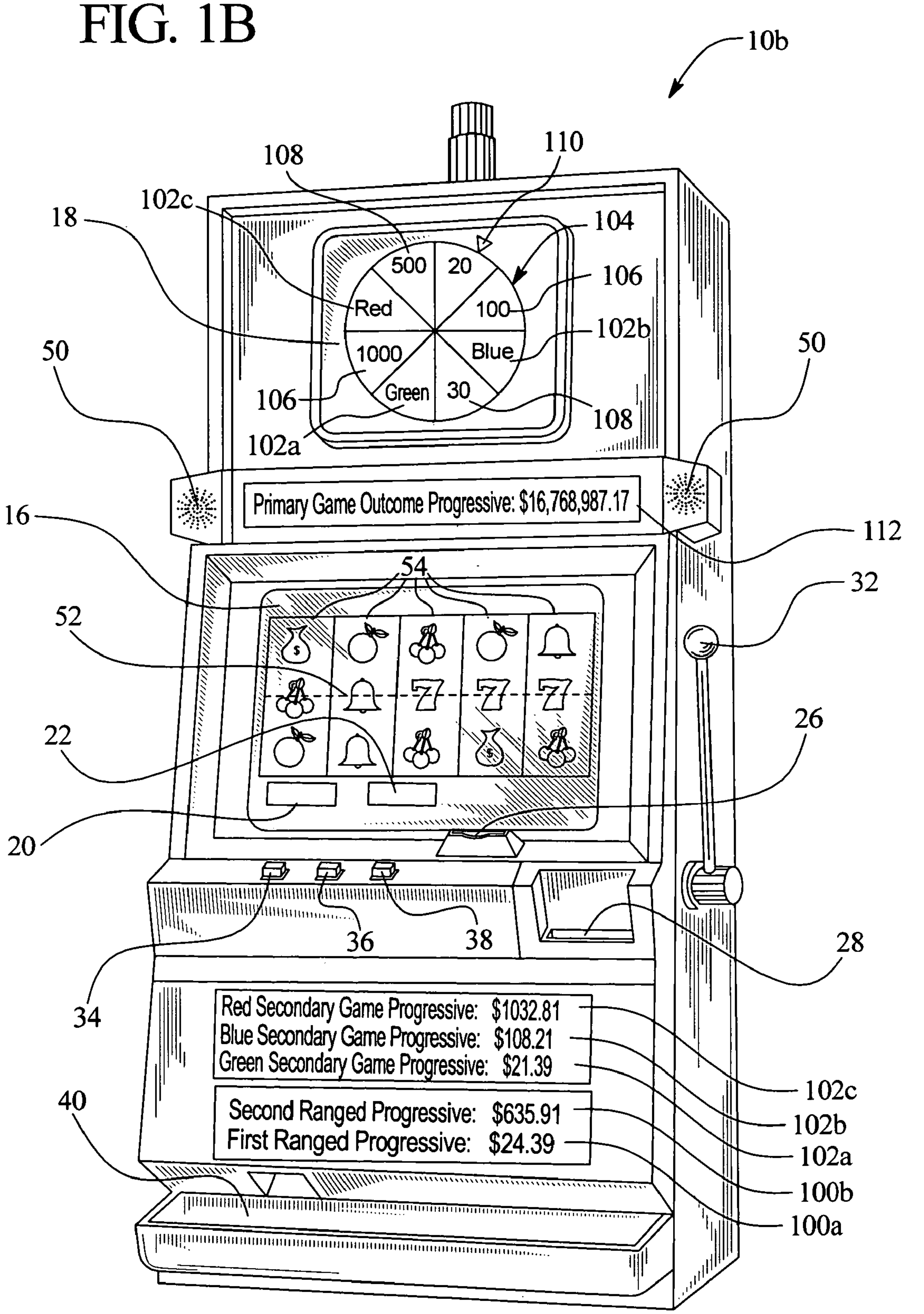
FIG. 1B is a front-side perspective view of another embodiment of the gaming device disclosed herein.

Referring now to the drawings, two alternative embodiments of the gaming device are illustrated in FIGS. 1A and 1B as gaming device 10*a* and gaming device 10*b*, respectively. Gaming device 10*a* and/or gaming device 10*b* are generally referred to herein as gaming device 10.

In one embodiment, as illustrated in FIGS. 1A and 1B, gaming device 10 has a support structure, housing or cabinet which provides support for a plurality of displays, inputs, controls and other features of a conventional gaming machine. It is configured so that a player can operate it while standing or sitting. The gaming device may be positioned on a base or stand or can be configured as a pub-style table-top game (not shown) which a player can operate preferably while sitting. As illustrated by the different configurations shown in FIGS. 1A and 1B, the gaming device may have varying cabinet and display configurations.

Figure 2A:
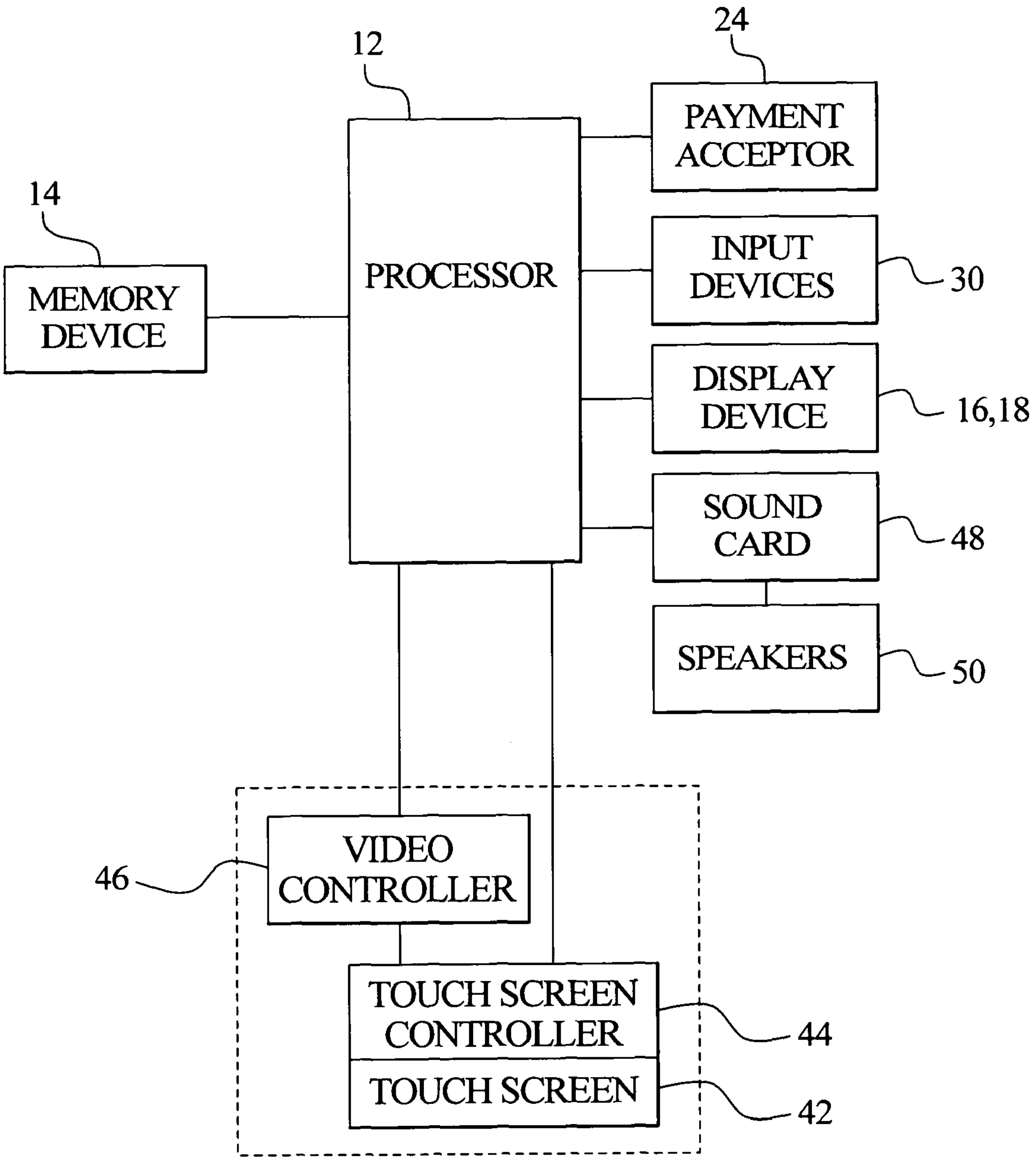
FIG. 2A is a schematic block diagram of the electronic configuration of one embodiment of the gaming device disclosed herein.

In one embodiment, as illustrated in FIG. 2A, the gaming device preferably includes at least one processor 12, such as a microprocessor, a microcontroller-based platform, a suitable integrated circuit or one or more application-specific integrated circuits (ASIC's). The processor is in communication with or operable to access or to exchange signals with at least one data storage or memory device 14. In one embodiment, the processor and the memory device reside within the cabinet of the gaming device. The memory device stores program code and instructions, executable by the processor, to control the gaming device. The memory device also stores other data such as image data, event data, player input data, random or pseudo-random number generators, pay-table data or information and applicable game rules that relate to the play of the gaming device. In one embodiment, the memory device includes random access memory (RAM), which can include non-volatile RAM (NVRAM), magnetic RAM (MRAM), ferroelectric RAM (FeRAM) and other forms as commonly understood in the art. In one embodiment, the memory device includes read only memory (ROM). In one embodiment, the memory device includes flash memory and/or EEPROM (electrically erasable programmable read only memory). Any other suitable magnetic, optical and/or semiconductor memory may operate in conjunction with the gaming device disclosed herein.

In one embodiment, part or all of the program code and/or operating data described above can be stored in a detachable or removable memory device, including, but not limited to, a suitable cartridge, disk, CD ROM, DVD or USB memory device. A player can use such a removable memory device in a desktop, a laptop personal computer, a personal digital assistant (PDA) or other computerized platform. The processor and memory device may be collectively referred to herein as a "computer" or "controller."

In one embodiment, as discussed in more detail below, the gaming device randomly generates awards and/or other game outcomes based on probability data. That is, each award or other game outcome is associated with a probability and the gaming device generates the award or other game outcome to be provided to the player based on the associated probabilities. In this embodiment, since the gaming device generates outcomes randomly or based upon a probability calculation, there is no certainty that the gaming device will ever provide the player with any specific award or other game outcome. Such random determination could be provided through utilization of a random number generator (RNG) or other suitable randomization process.

In another embodiment, as discussed in more detail below, the gaming device employs a predetermined or finite set or pool of awards or other game outcomes. In this embodiment, as each award or other game outcome is provided to the player, the gaming device removes the provided award or other game outcome from the predetermined set or pool. Once removed from the set or pool, the specific provided award or other game outcome cannot be provided to the player again. This type of gaming device provides players with all of the available awards or other game outcomes over the course of the play cycle and guarantees the amount of actual wins and losses. In another embodiment, upon a player initiating game play at the gaming device, the gaming device enrolls in a bingo game. In this embodiment, a bingo server calls the bingo balls that result in a specific game outcome. The resultant game outcome is communicated to the individual gaming device to be provided to a player.

In one embodiment, as illustrated in FIG. 2A, the gaming device includes one or more display devices controlled by the processor. The display devices are preferably connected to or mounted to the cabinet of the gaming device. The embodiment shown in FIG. 1A includes a central display device 16 which displays a primary game. This display device may also display any secondary game associated with the primary game as well as information relating to the primary or secondary game. The alternative embodiment shown in FIG. 1B includes a central display device 16 and an upper display device 18. The upper display device may display the primary game, any suitable secondary game associated with the primary game and/or information relating to the primary or secondary game. In another embodiment, at least one display device may be a mobile display device, such as a PDA or tablet PC, that enables play of at least a portion of the primary or secondary game at a location remote from the gaming device. As seen in FIGS. 1A and 1B, in one embodiment, the gaming device includes a credit display 20 which displays a player's current number of credits, cash, account balance or the equivalent. In one embodiment, gaming device includes a bet display 22 which displays a player's amount wagered.

The display devices may include, without limitation, a monitor, a television display, a plasma display, a liquid crystal display (LCD) a display based on light emitting diodes (LED), a display based on a plurality of organic light-emitting diodes (OLEDs), a display based on polymer light-emitting diodes (PLEDs), a display including a projected and/or reflected image or any other suitable electronic device or display mechanism. In one embodiment, as described in more detail below, the display device includes a touch-screen with an associated touch-screen controller. The display devices may be of any suitable configuration, such as a square, a rectangle or an elongated rectangle.

The display devices of the gaming device are configured to display at least one and preferably a plurality of game or other suitable images, symbols and indicia such as any visual representation or exhibition of the movement of objects such as mechanical, virtual or video reels and wheels, dynamic lighting, video images, images of people, characters, places, things and faces of cards, tournament advertisements and the like.

In one alternative embodiment, the symbols, images and indicia displayed on or of the display device may be in mechanical form. That is, the display device may include any electromechanical device, such as one or more mechanical objects, such as one or more rotatable wheels, reels or dice, configured to display at least one and preferably a plurality of game or other suitable images, symbols or indicia.

As illustrated in FIG. 2A, in one embodiment, the gaming device includes at least one payment acceptor 24 in communication with the processor. As seen in FIGS. 1A and 1B, the payment acceptor may include a coin slot 26 and a payment, note or bill acceptor 28, where the player inserts money, coins or tokens. The player can place coins in the coin slot or paper money, ticket or voucher into the payment, note or bill acceptor. In other embodiments, devices such as readers or validators for credit cards, debit cards or credit slips may accept payment. In one embodiment, a player may insert an identification card into a card reader of the gaming device. In one embodiment, the identification card is a smart card having a programmed microchip or a magnetic strip coded with a player's identification, credit totals and other relevant information. In one embodiment, money may be transferred to a gaming device through electronic funds transfer. When a player funds the gaming device, the processor determines the amount of funds entered and displays the corresponding amount on the credit or other suitable display as described above.

As seen in FIGS. 1A, 1B and 2A, in one embodiment the gaming device includes at least one and preferably a plurality of input devices 30 in communication with the processor. The input devices can include any suitable device which enables the player to produce an input signal which is read by the processor. In one embodiment, after appropriate funding of the gaming device, the input device is a game activation device, such as a pull arm 32 or a play button 34 which is used by the player to start any primary game or sequence of events in the gaming device. The play button can be any suitable play activator such as a bet one button, a max bet button or a repeat the bet button. In one embodiment, upon appropriate funding, the gaming device begins the game play automatically. In another embodiment, upon the player engaging one of the play buttons, the gaming device automatically activates game play.

In one embodiment, as shown in FIGS. 1A and 1B, one input device is a bet one button 36. The player places a bet by pushing the bet one button. The player can increase the bet by one credit each time the player pushes the bet one button. When the player pushes the bet one button, the number of credits shown in the credit display preferably decreases by one, and the number of credits shown in the bet display preferably increases by one. In another embodiment, one input device is a bet max button (not shown) which enables the player to bet the maximum wager permitted for a game of the gaming device.

In one embodiment, one input device is a cash out button 38. The player may push the cash out button and cash out to receive a cash payment or other suitable form of payment corresponding to the number of remaining credits. In one embodiment, when the player cashes out, the player receives the coins or tokens in a coin payout tray 40. In one embodiment, when the player cashes out, the player may receive other payout mechanisms such as tickets or credit slips redeemable by a cashier or funding to the player's electronically recordable identification card.

In one embodiment, as mentioned above and seen in FIG. 2A, one input device is a touch-screen 42 coupled with a touch-screen controller 44, or some other touch-sensitive display overlay to enable for player interaction with the images on the display. The touch-screen and the touch-screen controller are connected to a video controller 46. A player can make decisions and input signals into the gaming device by touching the touch-screen at the appropriate places.

The gaming device may further include a plurality of communication ports for enabling communication of the processor with external peripherals, such as external video sources, expansion buses, game or other displays, an SCSI port or a key pad.

In one embodiment, as seen in FIG. 2A, the gaming device includes a sound generating device controlled by one or more sounds cards 48 which function in conjunction with the processor. In one embodiment, the sound generating device includes at least one and preferably a plurality of speakers 50 or other sound generating hardware and/or software for generating sounds, such as playing music for the primary and/or secondary game or for other modes of the gaming device, such as an attract mode. In one embodiment, the gaming device provides dynamic sounds coupled with attractive multimedia images displayed on one or more of the display devices to provide an audio-visual representation or to otherwise display full-motion video with sound to attract players to the gaming device. During idle periods, the gaming device may display a sequence of audio and/or visual attraction messages to attract potential players to the gaming device. The videos may also be customized for or to provide any appropriate information.

In one embodiment, the gaming machine may include a sensor, such as a camera in communication with the processor (and possibly controlled by the processor) that is selectively positioned to acquire an image of a player actively using the gaming device and/or the surrounding area of the gaming device. In one embodiment, the camera may be configured to selectively acquire still or moving (e.g., video) images and may be configured to acquire the images in either an analog, digital or other suitable format. The display devices may be configured to display the image acquired by the camera as well as display the visible manifestation of the game in split screen or picture-in-picture fashion. For example, the camera may acquire an image of the player and the processor may incorporate that image into the primary and/or secondary game as a game image, symbol or indicia.

Gaming device 10 can incorporate any suitable wagering primary or base game. The gaming machine or device may include some or all of the features of conventional gaming machines or devices. The primary or base game may comprise any suitable reel-type game, card game, number game or other game of chance susceptible to representation in an electronic or electromechanical form which produces a random outcome based on probability data upon activation from a wager. That is, different primary wagering games, such as video poker games, video blackjack games, video Keno, video bingo or any other suitable primary or base game may be implemented.

In one embodiment, as illustrated in FIGS. 1A and 1B, a base or primary game may be a slot game with one or more paylines 52. The paylines may be horizontal, vertical, circular, diagonal, angled or any combination thereof. In this embodiment, the gaming device displays at least one and preferably a plurality of reels 54, such as three to five reels 54 in either electromechanical form with mechanical rotating reels or video form with simulated reels and movement thereof. In one embodiment, an electromechanical slot machine includes a plurality of adjacent, rotatable wheels which may be combined and operably coupled with an electronic display of any suitable type. In another embodiment, if the reels 54 are in video form, one or more of the display devices, as described above, display the plurality of simulated video reels 54. Each reel 54 displays a plurality of indicia such as bells, hearts, fruits, numbers, letters, bars or other images which preferably correspond to a theme associated with the gaming device. In this embodiment, the gaming device awards prizes when the reels of the primary game stop spinning if specified types and/or configurations of indicia or symbols occur on an active payline or otherwise occur in a winning pattern, occur on the requisite number of adjacent reels and/or occur in a scatter pay arrangement.

In one embodiment, a base or primary game may be a poker game wherein the gaming device enables the player to play a conventional game of video poker and initially deals five cards all face up from a virtual deck of fifty-two card deck. Cards may be dealt as in a traditional game of cards or in the case of the gaming device, may also include that the cards are randomly selected from a predetermined number of cards. If the player wishes to draw, the player selects the cards to hold via one or more input device, such as pressing related hold buttons or via the touch screen. The player then presses the deal button and the unwanted or discarded cards are removed from the display and the gaming machine deals the replacement cards from the remaining cards in the deck. This results in a final five-card hand. The gaming device compares the final five-card hand to a payout table which utilizes conventional poker hand rankings to determine the winning hands. The gaming device provides the player with an award based on a winning hand and the credits the player wagered.

In another embodiment, the base or primary game may be a multi-hand version of video poker. In this embodiment, the gaming device deals the player at least two hands of cards. In one such embodiment, the cards are the same cards. In one embodiment each hand of cards is associated with its own deck of cards. The player chooses the cards to hold in a primary hand. The held cards in the primary hand are also held in the other hands of cards. The remaining non-held cards are removed from each hand displayed and for each hand replacement cards are randomly dealt into that hand. Since the replacement cards are randomly dealt independently for each hand, the replacement cards for each hand will usually be different. The poker hand rankings are then determined hand by hand and awards are provided to the player.

In one embodiment, a base or primary game may be a keno game wherein the gaming device displays a plurality of selectable indicia or numbers on at least one of the display devices. In this embodiment, the player selects at least one and preferable a plurality of the selectable indicia or numbers via an input device or via the touch screen. The gaming device then displays a series of drawn numbers to determine an amount of matches, if any, between the player's selected numbers and the gaming device's drawn numbers. The player is provided an award based on the amount of matches, if any, based on the amount of determined matches.

In one embodiment, in addition to winning credits in a base or primary game, the gaming device may also give players the opportunity to win credits in a bonus or secondary game or bonus or secondary round. The bonus or secondary game enables the player to obtain a prize or payout in addition to the prize or payout, if any, obtained from the base or primary game. In general, a bonus or secondary game produces a significantly higher level of player excitement than the base or primary game because it provides a greater expectation of winning than the base or primary game and is accompanied with more attractive or unusual features than the base or primary game.

In one embodiment, the bonus or secondary game may be any type of suitable game, either similar to or completely different from the base or primary game. In one embodiment, the gaming device includes a program which will automatically begin a bonus round when the player has achieved a triggering event or qualifying condition in the base or primary game. In one embodiment, the triggering event or qualifying condition may be a selected outcome in the primary game or a particular arrangement of one or more indicia on a display device in the primary game, such as the number seven appearing on three adjacent reels along a payline in the primary slot game embodiment seen in FIGS. 1A and 1B. In another embodiment, the triggering event or qualifying condition may be by exceeding a certain amount of game play (number of games, number of credits, amount of time), reaching a specified number of points earned during game play or as a random award.

In one embodiment, once a player has qualified for a bonus game, the player may subsequently enhance his/her bonus game participation through continued play on the base or primary game. Thus, for each bonus qualifying event, such as a bonus symbol, that the player obtains, a given number of bonus game wagering points or credits may be accumulated in a "bonus meter" programmed to accrue the bonus wagering credits or entries toward eventual participation in a bonus game. The occurrence of multiple such bonus qualifying events in the primary game may result in an arithmetic or geometric increase in the number of bonus wagering credits awarded. In one embodiment, the player may redeem extra bonus wagering credits during the bonus game to extend play of the bonus game.

In one embodiment, no separate entry fee or buy in for a bonus game need be employed. That is, a player may not purchase an entry into a bonus game, rather they must win or earn entry through play of the primary game thus, encouraging play of the primary game. In another embodiment, qualification of the bonus or secondary game is accomplished through a simple "buy in" by the player if, for example, the player has been unsuccessful at qualifying through other specified activities.

Figure 2B:
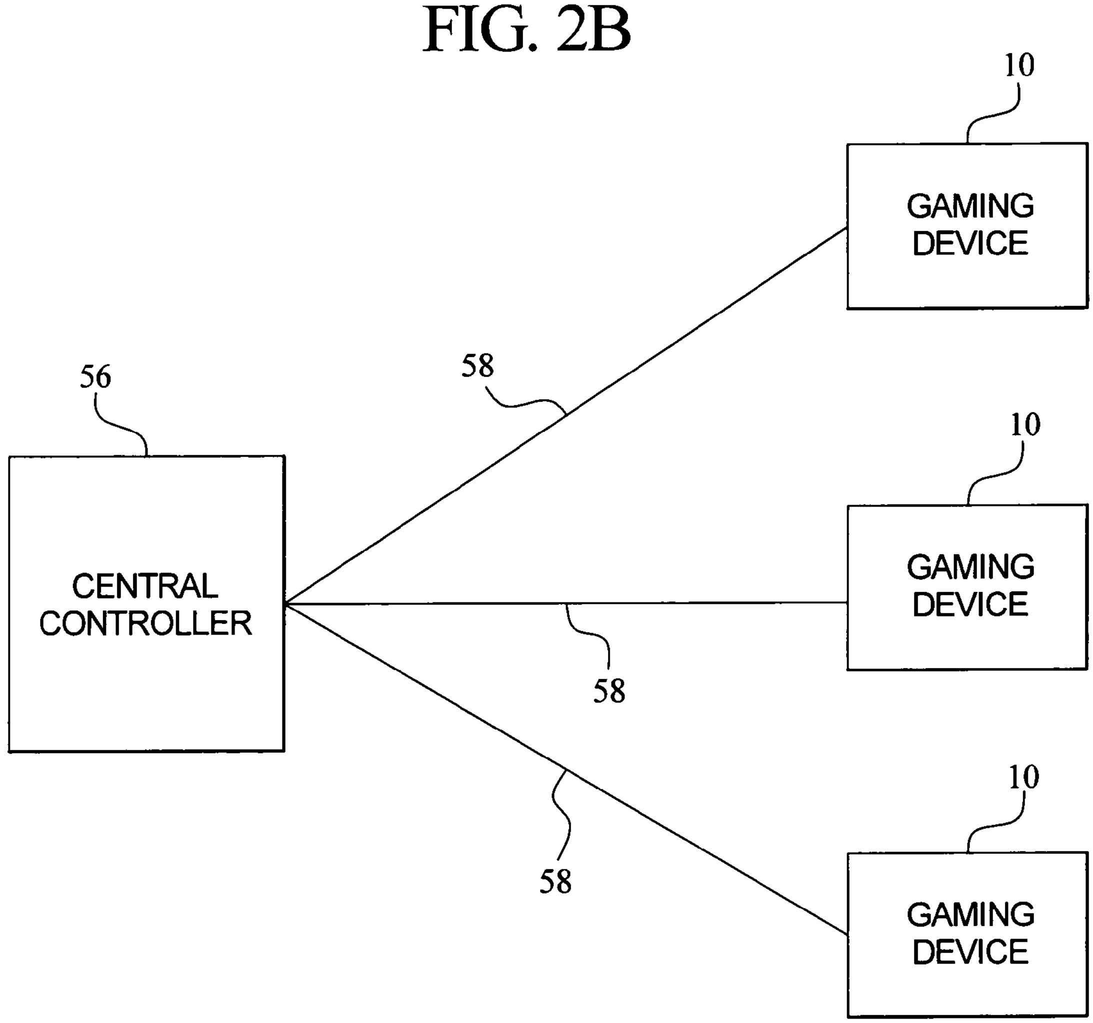
FIG. 2B is a schematic block diagram illustrating a plurality of gaming terminals in communication with a central controller.

In one embodiment, as illustrated in FIG. 2B, one or more of the gaming devices 10 may be connected to each other through a data network or a remote communication link 58 with some or all of the functions of each gaming device provided at a central location such as a central server or central controller 56. More specifically, the processor of each gaming device may be designed to facilitate transmission of signals between the individual gaming device and the central server or controller. The linked gaming machines may be of the same type or of different types of gaming machines. The linked gaming machines may have the same primary game or two or more different primary games. The number of gaming machines in the gaming system can vary as desired by the implementer of the gaming system. These gaming machines are referred to herein alternatively as the group of gaming machines, the linked gaming machines or the system gaming machines.

In one embodiment, the game outcome provided to the player is determined by a central server or controller and provided to the player at the gaming device. In this embodiment, each of a plurality of such gaming devices are in communication with the central server or controller. Upon a player initiating game play at one of the gaming devices, the initiated gaming device communicates a game outcome request to the central server or controller.

In one embodiment, the central server or controller receives the game outcome request and randomly generates a game outcome for the primary game based on probability data. In another embodiment, the central server or controller randomly generates a game outcome for the secondary game based on probability data. In another embodiment, the central server or controller randomly generates a game outcome for both the primary game and the secondary game based on probability data. In this embodiment, the central server or controller is capable of storing and utilizing program code or other data similar to the processor and memory device of the gaming device.

In an alternative embodiment, the central server or controller maintains one or more predetermined pools or sets of predetermined game outcomes. In this embodiment, the central server or controller receives the game outcome request and independently selects a predetermined game outcome from a set or pool of game outcomes. The central server or controller flags or marks the selected game outcome as used. Once a game outcome is flagged as used, it is prevented from further selection from the set or pool and cannot be selected by the central controller or server upon another wager. The provided game outcome can include a primary game outcome, a secondary game outcome, primary and secondary game outcomes, or a series of game outcomes such a free games.

The central server or controller communicates the generated or selected game outcome to the initiated gaming device. The gaming device receives the generated or selected game outcome and provides the game outcome to the player. In an alternative embodiment, how the generated or selected game outcome is to be presented or displayed to the player, such as a reel symbol combination of a slot machine or a hand of cards dealt in a card game, is also determined by the central server or controller and communicated to the initiated gaming device to be presented or displayed to the player. Central production or control can assist a gaming establishment or other entity in maintaining appropriate records, controlling gaming, reducing and preventing cheating or electronic or other errors, reducing or eliminating win-loss volatility and the like.

In another embodiment, a predetermined game outcome value is determined for each of a plurality of linked or networked gaming devices based on the results of a bingo or keno game. In this embodiment, each individual gaming device utilizes one or more bingo or keno games to determine the predetermined game outcome value provided to the player for the interactive game played at that gaming device. In one embodiment, the bingo or keno game is displayed to the player. In another embodiment, the bingo or keno game is not displayed to the player, but the results of the bingo or keno game determine the predetermined game outcome value for the interactive game.

In the various bingo embodiments, as each gaming device is enrolled in the bingo game, such as upon an appropriate wager or engaging an input device, the enrolled gaming device is provided or associated with a different bingo card. Each bingo card consists of a matrix or array of elements, wherein each element is designated with a separate indicia, such as a number. It should be appreciated that each different bingo card includes a different combination of elements. For example, if four bingo cards are provided to four enrolled gaming devices, the same element may be present on all four of the bingo cards while another element may solely be present on one of the bingo cards.

In operation of these embodiments, upon providing or associating a different bingo card to each of a plurality of enrolled gaming devices, the central controller randomly selects or draws, one at a time, a plurality of the elements. As each element is selected, a determination is made for each gaming device as to whether the selected element is present on the bingo card provided to that enrolled gaming device. This determination can be made by the central controller, the gaming device, a combination of the two, or in any other suitable manner. If the selected element is present on the bingo card provided to that enrolled gaming device, that selected element on the provided bingo card is marked or flagged. This process of selecting elements and marking any selected elements on the provided bingo cards continues until one or more predetermined patterns are marked on one or more of the provided bingo cards. It should be appreciated that in one embodiment, the gaming device requires the player to engage a "daub" button (not shown) to initiate the process of the gaming device marking or flagging any selected elements.

After one or more predetermined patterns are marked on one or more of the provided bingo cards, a game outcome is determined for each of the enrolled gaming devices based, at least in part, on the selected elements on the provided bingo cards. As described above, the game outcome determined for each gaming device enrolled in the bingo game is utilized by that gaming device to determine the predetermined game outcome provided to the player. For example, a first gaming device to have selected elements marked in a predetermined pattern is provided a first outcome of win $10 which will be provided to a first player regardless of how the first player plays in a first game and a second gaming device to have selected elements marked in a different predetermined pattern is provided a second outcome of win $2 which will be provided to a second player regardless of how the second player plays a second game. It should be appreciated that as the process of marking selected elements continues until one or more predetermined patterns are marked, this embodiment insures that at least one bingo card will win the bingo game and thus at least one enrolled gaming device will provide a predetermined winning game outcome to a player. It should be appreciated that other suitable methods for selecting or determining one or more predetermined game outcomes may be employed.

In one example of the above-described embodiment, the predetermined game outcome may be based on a supplemental award in addition to any award provided for winning the bingo game as described above. In this embodiment, if one or more elements are marked in supplemental patterns within a designated number of drawn elements, a supplemental or intermittent award or value associated with the marked supplemental pattern is provided to the player as part of the predetermined game outcome. For example, if the four corners of a bingo card are marked within the first twenty selected elements, a supplemental award of $10 is provided to the player as part of the predetermined game outcome. It should be appreciated that in this embodiment, the player of a gaming device may be provided a supplemental or intermittent award regardless of if the enrolled gaming device's provided bingo card wins or does not win the bingo game as described above.

In another embodiment, one or more of the gaming devices are in communication with a central server or controller for monitoring purposes only. That is, each individual gaming device randomly generates the game outcomes to be provided to the player and the central server or controller monitors the activities and events occurring on the plurality of gaming devices. In one embodiment, the gaming network includes a real-time or on-line accounting and gaming information system operably coupled to the central server or controller. The accounting and gaming information system of this embodiment includes a player database for storing player profiles, a player tracking module for tracking players and a credit system for providing automated casino transactions. In one embodiment, the central server keeps track of the play on each gaming machine including at least: (1) the amount wagered by the player(s) for each play of the primary game for each gaming machine (i.e., a total or partial coin-in or wager meter which tracks the total or partial coin-in wagers placed on all of the primary games for all of the gaming machines in the gaming system); and (2) the time the wagers are placed or the amount of time between each play of the primary game for each gaming machine. It should be appreciated that the player of a gaming machine may change during this tracking and that this tracking can be independent of the specific player playing the gaming machine.

A plurality of the gaming devices are capable of being connected together through a data network. In one embodiment, the data network is a local area network (LAN), in which one or more of the gaming devices are substantially proximate to each other and an on-site central server or controller as in, for example, a gaming establishment or a portion of a gaming establishment. In another embodiment, the data network is a wide area network (WAN) in which one or more of the gaming devices are in communication with at least one off-site central server or controller. In this embodiment, the plurality of gaming devices may be located in a different part of the gaming establishment or within a different gaming establishment than the off-site central server or controller. Thus, the WAN may include an off-site central server or controller and an off-site gaming device located within gaming establishments in the same geographic area, such as a city or state. The WAN gaming system may be substantially identical to the LAN gaming system described above, although the number of gaming devices in each system may vary relative to each other.

In another embodiment, the data network is an internet or intranet. In this embodiment, the operation of the gaming device can be viewed at the gaming device with at least one internet browser. In this embodiment, operation of the gaming device and accumulation of credits may be accomplished with only a connection to the central server or controller (the internet/intranet server) through a conventional phone or other data transmission line, digital subscriber line (DSL), T-1 line, coaxial cable, fiber optic cable, or other suitable connection. In this embodiment, players may access an internet game page from any location where an internet connection and computer, or other internet facilitator are available. The expansion in the number of computers and number and speed of internet connections in recent years increases opportunities for players to play from an ever-increasing number of remote sites. It should be appreciated that enhanced bandwidth of digital wireless communications may render such technology suitable for some or all communications, particularly if such communications are encrypted. Higher data transmission speeds may be useful for enhancing the sophistication and response of the display and interaction with the player.

In another embodiment, as described above, one or more gaming devices are in communication with a central server or controller. The central server or controller may be any suitable server or computing device which includes at least one processor and a memory or storage device. In alternative embodiments, the central server is a progressive controller or another gaming machine in the gaming system. In one embodiment, the memory device stores different game programs and instructions, executable by a gaming device processor, to control the gaming device. Each executable game program represents a different game or type of game which may be played on one or more of the gaming devices in the gaming system. Such different games may include the same or substantially the same game play with different pay tables. In different embodiments, the executable game program is for a primary game, a secondary game or both. In another embodiment, the game program may be executable as a secondary game to be played simultaneous with the play of a primary game (which may be downloaded to or fixed on the gaming device) or vice versa.

In this embodiment, each gaming device at least includes one or more display devices and/or one or more input devices for interaction with a player. A local processor, such as the above-described gaming device processor or a processor of a local server, is operable with the display device(s) and/or the input device(s) of one or more of the gaming devices.

In operation, the central controller is operable to communicate one or more of the stored game programs to at least one local processor. In different embodiments, the stored game programs are communicated or delivered by embedding the communicated game program in a device or a component (e.g., a "chip" to be inserted in a gaming device), writing the game program on a disc or other media, downloading or streaming the game program over a dedicated data network, internet or a telephone line. After the stored game programs are communicated from the central server, the local processor executes the communicated program to facilitate play of the communicated program by a player through the display device(s) and/or input device(s) of the gaming device. That is, when a game program is communicated to a local processor, the local processor changes the game or type of game played at the gaming device.

Progressive Awards

In one embodiment, a plurality of gaming devices at one or more gaming sites are networked to the central server in a progressive configuration, wherein a portion of each wager placed is allocated to one or more progressive awards. In one embodiment, the progressive awards are associated with the system gaming machines which each contribute portions of the progressive awards. In one such embodiment, different progressive awards are associated with different numbers of gaming devices. For example, a progressive award valued at $10,000 may be associated with ten gaming devices while another progressive award valued at $500,000 may be associated with one-hundred gaming devices. In one embodiment, the multiple gaming machines may be in the same bank of machines, in the same casino or gaming establishment such as through LAN or in two or more different casinos or gaming establishments such as through a WAN. In another embodiment, each individual gaming machine maintains one or more progressive awards wherein a portion of each wager placed at that respective gaming machine is allocated to one or more progressive awards maintained by such individual gaming machine. In another embodiment, each individual gaming machine maintains one or more progressive awards and the central server simultaneously or substantially simultaneously maintains one or more progressive awards. In one such embodiment, the lower valued, more frequently triggered progressive awards are maintained by the individual gaming machines and the higher valued, less frequently triggered progressive awards are maintained by the central server.

In one embodiment, a host site computer is coupled to a plurality of the central servers at a variety of mutually remote gaming sites for providing a multi-site linked progressive automated gaming system. In one embodiment, a host site computer may serve gaming devices distributed throughout a number of properties at different geographical locations including, for example, different locations within a city or different cities within a state. In one embodiment, the host site computer is maintained for the overall operation and control of the system. In this embodiment, a host site computer oversees all or part of the progressive gaming system and is the master for computing all or part of the progressive jackpots. All participating gaming sites report to, and receive information from, the host site computer. Each central server computer is responsible for all data communication between the gaming device hardware and software and the host site computer.

In one embodiment, the progressive awards start at different levels such as $10, $100, $1000 and $10,000 and increment or increase until provided to a player. The progressive awards accumulate based on a small percentage (such as 0.1%) of coin-in or wagered amounts in a conventional manner. In one embodiment, the percentage that goes to each progressive award is equal (such as 0.1% to each of four progressive awards). At this accrual rate, player wagers totaling $1,000,000 are required for the progressive to reach $1000. At least a fraction of this amount may be funded by the casino by using a starting value higher than zero to make the progressives attractive even after they are reset. In other embodiments, two or more of the progressive awards may be funded by different percentages. In these embodiments, the central server and/or individual gaming device processor continues to increase the progressive levels until a progressive award is provided to a player (upon the occurrence of a progressive award triggering event), at which point the progressive is reset and another progressive award starts incrementing from the appropriate default progressive award level. In another embodiment, two or more of the progressive awards may be funded at different temporal rates. In this embodiment, the different progressive awards are incremented or funded in different increments of time wherein until the progressive hits, a set amount is added to the progressive at each determined time increment. In another embodiment, two or more of the progressive awards may each be incremented or funded based on different incrementing factors or incrementors. In this embodiment, a first of the progressive awards may increment each time a first incrementing factor occurs and a second of the progressive awards may increment each time a second incrementing factor occurs, wherein the first incrementing factor and the second incrementing factor are different. Examples of incrementing factors could be a symbol-driven trigger in the base game, the player betting a maximum amount, a percentage of possible gaming machines being actively played or in active status, or any other suitable method for defining an incrementor.

In one embodiment, one or more of the progressive awards are funded, at least partially, via a side-bet or side-wager which the player may make (and which may be tracked via a side-bet meter). In one embodiment, one or more of the progressive awards are funded with only side-bets or side-wagers placed. In another embodiment, one or more of the progressive awards are funded based on player's wagers as described above as well as any side-bets or side-wagers placed.

In one alternative embodiment, a minimum wager level is required for a gaming machine to qualify to be selected to obtain one of the progressive awards. In one embodiment, this minimum wager level is the maximum wager level for the primary game in the gaming machine. In another embodiment, no minimum wager level is required for a gaming machine to qualify to be selected to obtain one of the progressive awards.

In another embodiment, one or more progressive awards are funded, at least partially, via an amount provided by one or more marketing and/or advertising departments, such as a casino's marketing department. In this embodiment, when a progressive award increments to the amount of money provided by the marketing or advertising department (or any other designated amount), the progressive award is triggered and provided to one or more players.

In one embodiment, the central server or other central controller determines when one or more progressive wins are triggered. In this embodiment, a central controller and an individual gaming machine work in conjunction with each other to determine when a progressive win is triggered, for example through an individual gaming machine meeting a predetermined requirement or criteria established by the central controller. In another embodiment, an individual gaming machine may determine when one or more progressive wins are triggered. In another embodiment, an individual gaming machine may determine when at least one progressive win is triggered and the central controller determines when at least one progressive win is triggered.

In one embodiment, as described in more detail below, the gaming system includes a plurality of different types of progressive awards adapted to be provided to one or more players of the gaming machines in the gaming system. In one embodiment, the different types of progressive awards are provided to the player based on the occurrences of one or more different triggering or qualifying conditions or criteria. For example, at least one progressive award is provided when such progressive award increments to a certain predetermined amount, at least another progressive award is provided based on an outcome of a randomly triggered secondary game, and at least another progressive award is provided if a designated outcome is generated in a primary game. Such different triggering events for different progressive awards significantly increases the probability that at least one incremented progressive award will be available at any time as well as significantly increases the probability that, at any given time, the gaming system will be offering at least one progressive award that a player views as valuable or worth trying for. In one embodiment, the gaming devices of the gaming system are operable to provide multiple progressive awards to multiple players at the multiple linked gaming devices at the same time or substantially the same time. Alternatively, the gaming devices of the gaming system are operable to provide multiple progressive awards to multiple players at the multiple linked gaming devices in an overlapping or sequential manner.

In one embodiment, different gaming devices in the gaming system have different progressive awards available to the player. In one such embodiment, different types of gaming devices are associated with different types of progressive awards based on the current configuration of the gaming system. In one embodiment, zero, one or more progressive awards may be associated with each of the gaming devices in the gaming system while zero, one or more different progressive awards may be associated with a plurality of, but not all of the gaming devices in the gaming system. For example, both a first set of gaming devices and a second, different set of gaming devices may be associated with a ranged progressive award, but the first set of gaming devices is also associated with a symbol-driven progressive award (which the second set of gaming devices is not) while the second set of gaming devices is associated with a secondary game progressive award (which the first set of gaming devices is not).

In one embodiment, at least one and preferably a plurality of the progressive awards maintained by the gaming system are provided to players of the linked gaming machines in an apparently random fashion as perceived by the players of these gaming machines. These progressive awards are distinguished from the awards that the gaming machines provide to the players for winning outcomes in the plays of the primary wagering games, such as slot games, card games (e.g., poker, blackjack) or any other suitable game.

In one embodiment, the gaming devices do not provide any apparent reasons to the players for obtaining such progressive awards. In this embodiment, providing the progressive awards is not triggered by an event in the primary game or based specifically on any of the plays of any primary game or on any of the plays of any secondary game of the gaming machines in the system. That is, these progressive awards are provided to the players without any explanation or alternatively with simple explanations.

In one embodiment, one or more progressive awards are each associated with a separate range of values. In this embodiment, a triggering event will occur and one of the progressive awards will be provided when that progressive award increments or increases to a predetermined progressive hit value within the range of possible values associated with that progressive award. For example, as illustrated in FIGS. 1A and 1B, a first progressive award 100*a* (identified as the first ranged progressive award for illustration purposes) is associated with a value range of $10 to $100 (not shown). In this example, a second progressive award 100*b* (identified as the second ranged progressive award for illustration purposes) is associated with a value range of $100 to $1,000 (not shown). In this example, a triggering event will occur and the first ranged progressive award 100*a* will be provided to a player when the value of the first ranged progressive award is in the range of $10 to $100. In this example, another triggering event will occur and the second ranged progressive award 100*b* will be provided to a player when the value of the second ranged progressive award is in the range of $100 to $1,000. In this embodiment, the amount which each ranged progressive award may increment to is capped or limited by the highest value in the value range associated with such ranged progressive award. That is, since each ranged progressive must be provided to a player when the value of that ranged progressive reaches the progressive hit value, these ranged progressives are guaranteed to be provided to the players of the gaming devices in the gaming system. In other words, because these progressives are capped at a specified value, they will tend to hit more frequently.

Figure 3:
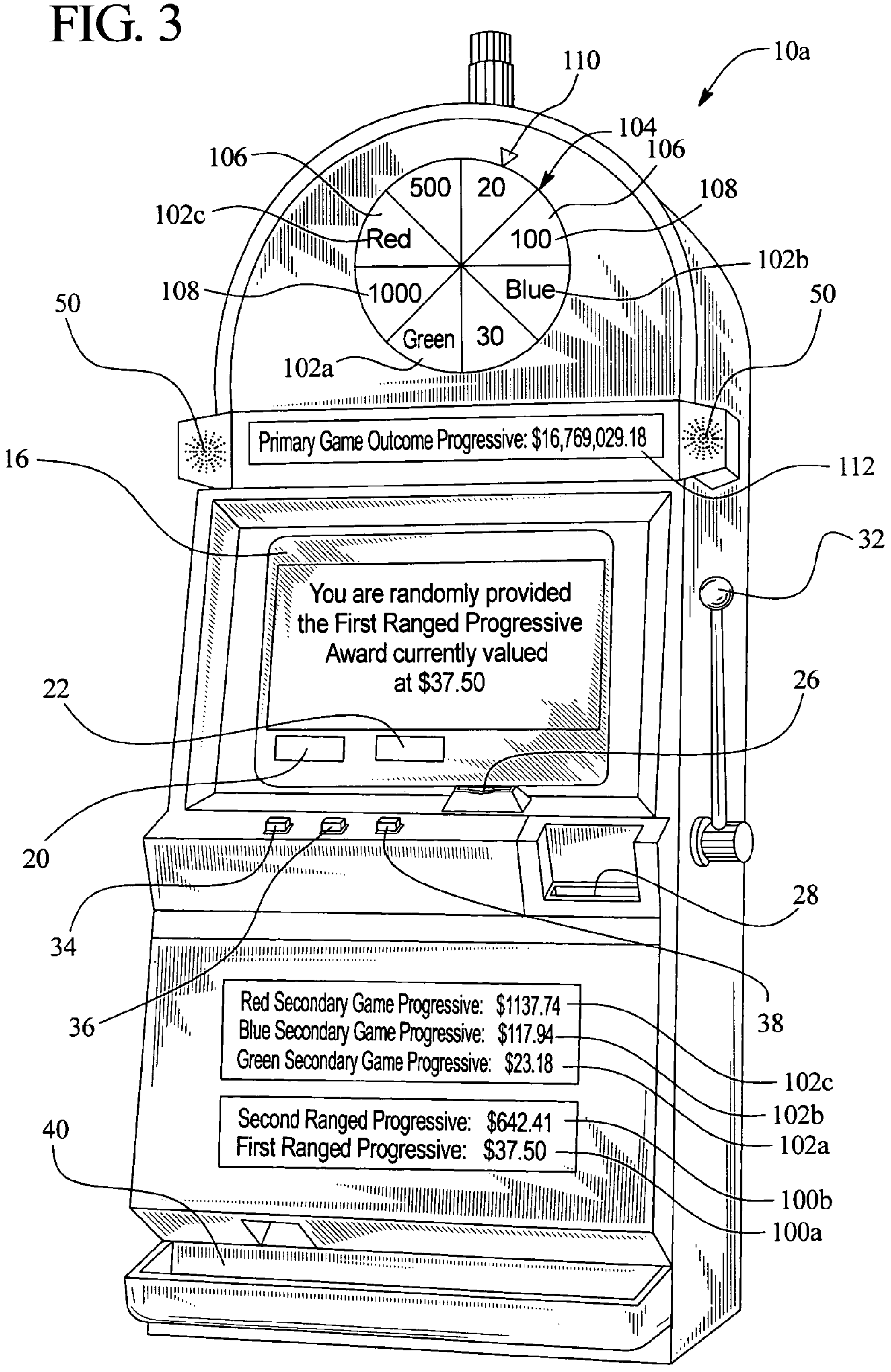
FIG. 3 is a front-side perspective view of one embodiment of the gaming device disclosed herein illustrating a progressive award being provided to a player as a result of the progressive award incrementing to a progressive hit value.

In different embodiments, the incremented progressive award value at which a triggering event will occur and that ranged progressive award will be provided to a player (i.e., the progressive hit value) is predetermined, randomly determined, determined based on the player's wager, determined based on the status of one or more players (such as determined through a player tracking system), determined based on time, or determined based on any other suitable method. For example, as illustrated in FIG. 3, if the progressive hit value of $37.50 is selected as the predetermined progressive hit value for the first ranged progressive award 100*a*, then when the first ranged progressive award increases to $37.50, a triggering event will occur and the first ranged progressive award will be provided to a player. After the first ranged progressive award is provided to a player, the first ranged progressive award is reset to a default value and starts incrementing from the default progressive award level. It should be appreciated that although the first ranged progressive award is reset to an appropriate progressive award level, none of the remaining progressive awards are reset or otherwise affected by the triggering of the first progressive award. Appropriate messages such as "YOU ARE RANDOMLY PROVIDED THE WHITE PROGRESSIVE AWARD CURRENTLY VALUED AT $37.50" may be provided to the player visually, or through suitable audio or audiovisual displays.

In one embodiment, the first ranged progressive award is provided to the player whose coin-in caused the first ranged progressive award to increment to its predetermined progressive hit value of $37.50. In different embodiments, the coin-in is determined in any suitable manner, such as by calculating which coin-in will cause the value to change to $37.50, by monitoring the coins-in versus the progressive award value or by calculating the coin-in value in advance based on the wagers, the progressive award hit value, and the percentage of the wagers allocated to the progressive award. For example, on a $1 wager with 0.1% allocated to the first ranged progressive award which hits at $37.50, the 37,500$^{th}$ coin wagered (if the casino chooses to start the progressive award at zero) results in the first range progressive award reaching its predetermined progressive hit value (and thus providing the first ranged progressive award to a player). In one embodiment, if the casino chooses to start the progressive at a higher level to attract more players, this coin-in value is adjusted to account for the initial starting value. For example, the calculation would subtract 10,000 coins from the coin-in value if the progressive starts at $10.00. Additionally, in one embodiment, instead of calculating the coin-in for a predetermined progressive hit value, the gaming machine uses the range information, the hit values and the wagers placed to determine a range of coin-in values which satisfy the parameters for that ranged progressive. In this embodiment, the gaming system determines that the ranged progressive that hits between $10 and $100 requires between 10,000 and 100,000 coins-in. It should be appreciated that this gaming system chooses an appropriate coin-in hit value in any suitable manner. For example, the system randomly chooses the coin-in hit value, chooses the coin-in hit value based on a weighted parameter, chooses the coin-in hit value based upon a determined subset range, or chooses the coin-in hit value based on any other suitable manner.

In one embodiment, a plurality of the progressive awards are associated with different value ranges. In another embodiment, each of the progressive awards is associated with a different value range. In another embodiment, a plurality of the progressive awards are associated with the same value range. In one embodiment, such capped or limited progressive awards are maintained by the central controller and adapted to be provided to any of the gaming machines in the gaming system. In another embodiment, such capped or limited progressive awards are maintained by each individual gaming machine and adapted to be provided to a player of that individual gaming machine.

It should be appreciated that due to the different progressive awards being triggered at different times and based on different triggering criteria, a plurality of progressive awards with different default values may overlap in value. That is, a first progressive award with a lower default or reset value than a second progressive award may, at times, be incremented to a value higher than the second progressive with the higher default value. For example, if a second progressive award has recently been hit and reset to its default value of $100 which is lower than the current value of $165 for the first progressive award (which may not have been triggered for a substantial period of time), then the first progressive award will have a greater value than the second progressive award (even thought the second progressive award has a higher default value and may increment at a greater frequency and/or greater percentage of wagers placed).

In one embodiment, one or more progressive awards are each associated with a secondary game. For example, a third progressive award 102*a* (identified as the green secondary game progressive award for illustration purposes), a fourth progressive award 102*b* (identified as the blue secondary game progressive award for illustration purposes) and a fifth progressive award (identified as the red secondary game progressive award for illustration purposes) are each associated with the secondary game. The number of progressive awards associated with the secondary game may be predetermined, randomly determined, determined based on the player's wager, determined based on the status of one or more players (such as determined through a player tracking system), determined based on time, or determined based on any other suitable method.

In one embodiment, the secondary game includes an award generator, such as the wheel 104 illustrated in FIGS. 1A and 1B. In one embodiment, the award generator of the secondary game is divided into a plurality of sections 106. Each section includes or is associated with either a fixed award or outcome 108 or one of the progressive awards associated with the secondary game 102*a*, 102*b* and 102*c*. For example, one section is associated with the fixed award of five-hundred and another section is associated with the fourth progressive award (i.e., the blue secondary game progressive award). In different embodiments, the fixed awards associated with the sections of the award generator may be predetermined, randomly determined, determined based on the player's wager, determined based on the status of one or more players (such as determined through a player tracking system), determined based on time, or determined based on any other suitable method. The fixed awards or outcomes may be any suitable award or outcome such as, but not limited to, a value, a multiplier, a modifier, a number of free games, or a replay of one or more previous games. In one alternative embodiment, the fixed awards are adapted to be changeable between games, such as based on betting history, or based upon any suitable factor.

In one embodiment, if the central controller determines to provide a gaming device in the gaming system a chance at winning one of the progressive awards in the secondary game, that gaming device activates the award generator. Utilizing an appropriate indicator 110, the activated award generator indicates one of the awards associated with the award generator and the indicated award is provided to the player. It should be appreciated that in this embodiment, the chances of a player winning one of these progressive awards is based on: (i) the probability that the secondary game will be randomly triggered for a chance to win the progressive award in the secondary game; and (ii) the probability that the award generator of the secondary game will randomly generate a progressive award. Since providing a progressive award in the secondary game is based on a plurality of random generations, in this embodiment, the amount which each progressive award associated with the secondary game is incremented to is not capped or unlimited and thus may grow to large levels. Additionally, this set-up leads to increased player satisfaction with the gaming system as players are known to play a gaming device for the chance at an award generator, such as a wheel, so even if they don't win the progressive award, they still are provided with the excitement associated with winning a wheel spin.

Figure 4A:
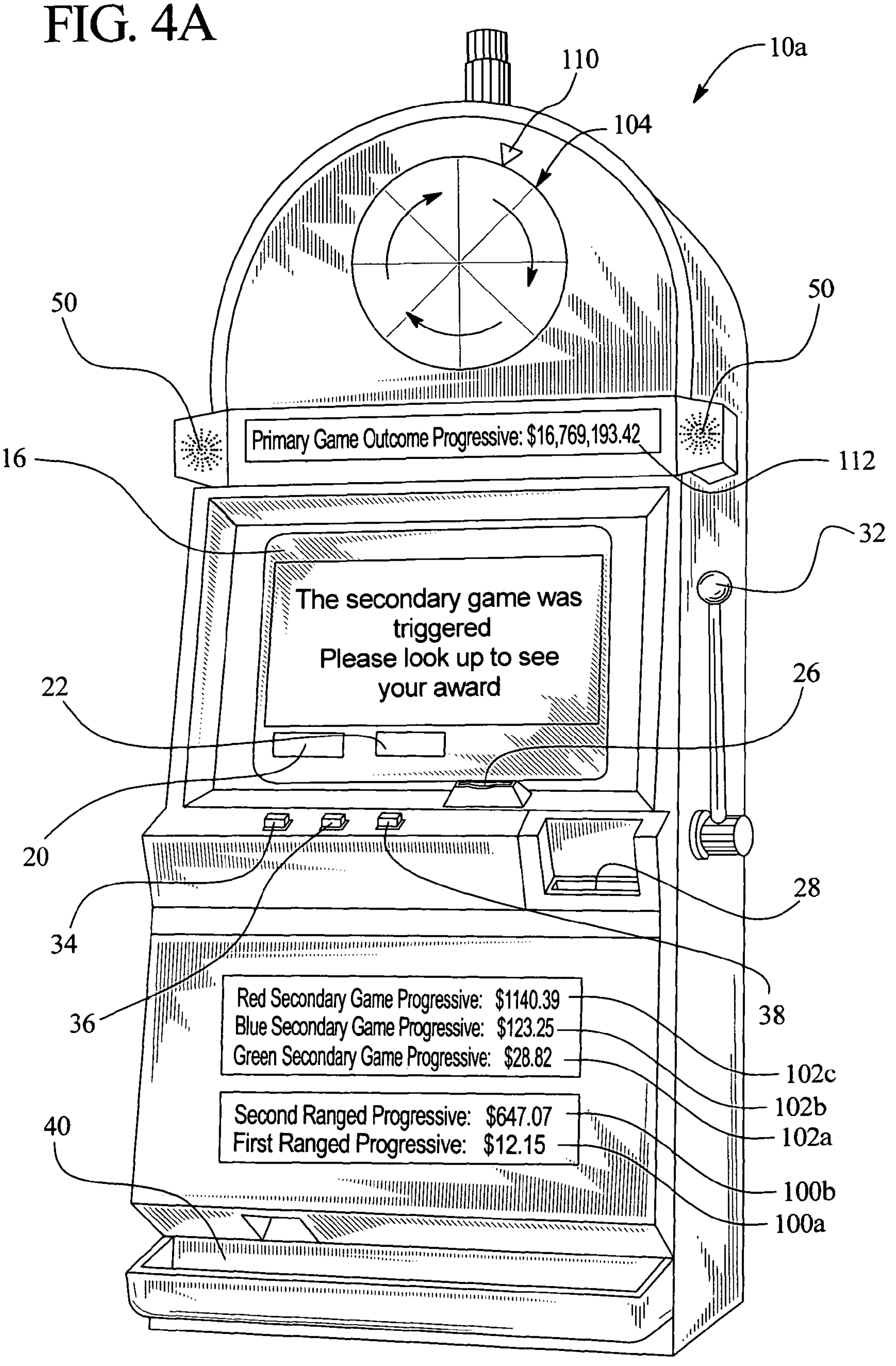
FIGS. 4A and 4B are front-side perspective views of one embodiment of the gaming device disclosed herein illustrating another progressive award being provided to a player as a result of a secondary game which is randomly triggered.
Figure 4B:
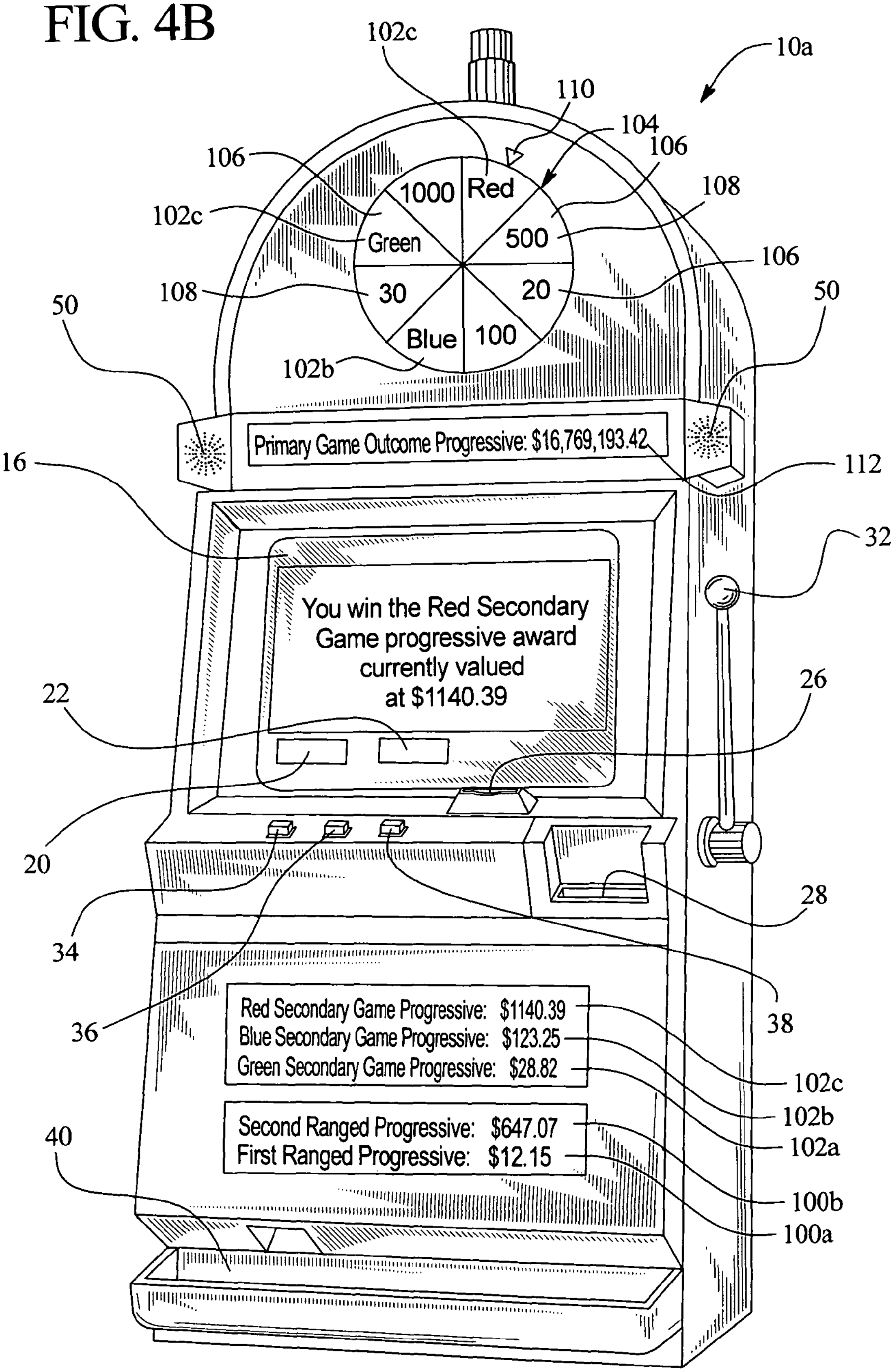

For example, as illustrated in FIGS. 4A and 4B, if the secondary game is randomly triggered, the gaming device initiates the award generator causing it to spin. The award generator stops spinning and the fixed award or progressive award associated with the indicated section of the award generator is provided to the player. In this case, the indicated section is associated with the fifth progressive award 102*c* (illustrated as the red secondary game progressive award) and thus the fifth progressive award, currently incremented to a value of $1140.39, is provided to the player. Appropriate messages such as "THE SECONDARY GAME WAS TRIGGERED," "PLEASE LOOK UP TO SEE YOUR AWARD" and "YOU WIN THE RED SECONDARY GAME PROGRESSIVE AWARD CURRENTLY VALUED AT $1140.39" may be provided to the player visually, or through suitable audio or audiovisual displays.

As described above, after the fifth progressive award associated with the secondary game (illustrated as the red secondary game progressive award) is provided to a player, the provided progressive award is reset to a default value and starts incrementing from the default progressive award level. It should be appreciated that although the provided progressive award associated with the secondary game is reset to an appropriate progressive award level, none of the remaining progressive awards associated with the gaming device are reset or otherwise affected by the triggering of the provided progressive award associated with the secondary game. Thus, even though one of the progressive awards associated with the secondary game is provided to a player, the remaining non-provided progressive awards associated with the secondary game continue to increment to greater and greater amounts until such progressive awards are provided to players.

In one embodiment, each progressive award of the secondary game is associated with an equal probability of being generated. In another embodiment, different progressive awards of the secondary game are associated with different probabilities of being generated. In different embodiments, the probability associated with each progressive award of the secondary game being generated is predetermined, randomly determined, determined based on the player's wager, determined based on the status of one or more players (such as determined through a player tracking system), determined based on time, or determined based on any other suitable method.

In one embodiment, each fixed award of the secondary game is associated with an equal probability of being generated. In another embodiment, different fixed awards of the secondary game are associated with different probabilities of being generated. In different embodiments, the probability associated with each fixed award of the secondary game being generated is predetermined, randomly determined, determined based on the player's wager, determined based on the status of one or more players (such as determined through a player tracking system), determined based on time, or determined based on any other suitable method.

In one embodiment, the triggering of the secondary game (i.e., the chance of winning one of the progressive awards associated with the secondary game) is tied to the side-bet or side-wager mentioned above. In one embodiment, the progressive awards and fixed awards associated with the secondary game are funded via a side-bet or side-wager. In one such embodiment, a player must place or wager the appropriate side bet or side wager to be eligible to play the secondary game (and thus be eligible to win one of the progressive awards associated with the secondary game). That is, any player who does not place the side-bet or side-wager cannot play the secondary game (and thus cannot win one of the progressive awards associated with the secondary game). In one embodiment, each player who places the side-bet has an equal probability or chance of playing the secondary game, regardless of that player's primary game wager. In another embodiment, if a player places the side-bet, that player's odds or probability of playing in the secondary game is based on that player's primary game wager. For example, if a first player wagers ten credits per payline (in addition to placing a side bet of one credit) and a second player wagers one credit per payline (in addition to placing a side bet of one credit), while both players are eligible to play in the secondary game, the first player has a ten times greater chance of playing in the secondary game (and thus a ten times greater chance of winning one of the progressive awards associated with the secondary game) than the second player.

It should be appreciated that to keep player excitement up and make sure the gaming machine is aligned with player expectation, the award generator, in this case a wheel, will need to be triggered to spin more than the progressives awards associated with the award generator are actually given away. To solve this, in one embodiment, the fixed awards associated with the award generator are funded via the side wager described above. In this embodiment, when a player is chosen for a chance at one of the progressive awards associated with the award generator, the wheel will spin and the player will either win a fixed award or one of the progressive awards associated with the award generator. The actual determination of what the player is awarded by the gaming machine is in line with the probabilities required to maintain the progressives at desirable levels.

For example, in one embodiment, the player is required to make a side bet of 5 credits to be eligible for the secondary bonus game described above. The side bet makes the player eligible for the secondary bonus game without requiring the player to place a maximum bet. That is, certain players are not interested in playing maximum bet and thus feel as though gaming devices that require a maximum bet for chance to participate in the secondary bonus game are unfair (which results in these player's staying away from such gaming devices). On the other hand, in this embodiment, all players who place the side bet will be eligible to participate in the secondary bonus game, but for every extra coin played per line, each player's odds of actually participating in the secondary bonus game improve. For example, if the odds of participating in the secondary bonus game are 1:90, any players who only bet one coin per line will keep these odds. However, any player who plays five coins per line have improved their odds of participating in the secondary bonus game to 1:18 as the gaming system will count their bet as five side bets. This encourages lower betting players to play as they are still eligible for the secondary bonus game, but also awards higher level betting players for their bigger bets. This embodiment enables the player to choose whether or not they wish to be eligible for the secondary game progressive based on a small side bet, as opposed to requiring a large maximum bet and thus will appeal to a broader type of players. Additionally, this embodiment still rewards those betting a larger amount by providing them a higher probability of reaching the secondary game, while affording all players who place a side bet the chance of entering the secondary game.

With these probabilities, it is expected that the cost for the players is an average of 400 credits for each participation in the secondary bonus game. In one embodiment, each of the sections or slices of the award wheel has an equal chance of being selected. However, this requires the award wheel to have a much lower set of available fixed awards. The following table provides an example of a probability table for the secondary bonus game, wherein the average expected value for a spin of the award generator (i.e., award wheel) is 400 credits and each slice of the award wheel has an equal probability of being selected.

| Position | Progressive | Value | Increment | Times | Probability | Contribution |
|---|---|---|---|---|---|---|
| 1 | | 25 | | 1 | 0.05000 | 1.25000 |
| 2 | | 125 | | 1 | 0.05000 | 6.25000 |
| 3 | | 175 | | 1 | 0.05000 | 8.75000 |
| 4 | | 100 | | 1 | 0.05000 | 5.00000 |
| 5 | | 50 | | 1 | 0.05000 | 2.50000 |
| 6 | Green | 1000 | 0.6% | 1 | 0.05000 | 50.00000 |
| 7 | | 125 | | 1 | 0.05000 | 6.25000 |
| 8 | | 150 | | 1 | 0.05000 | 7.50000 |
| 9 | | 75 | | 1 | 0.05000 | 3.75000 |
| 10 | | 40 | | 1 | 0.05000 | 2.00000 |
| 11 | Red | 3000 | 0.9% | 1 | 0.05000 | 150.00000 |
| 12 | | 100 | | 1 | 0.05000 | 5.00000 |
| 13 | | 35 | | 1 | 0.05000 | 1.75000 |
| 14 | | 250 | | 1 | 0.05000 | 12.50000 |
| 15 | | 125 | | 1 | 0.05000 | 6.25000 |
| 16 | Blue | 2000 | 0.7% | 1 | 0.05000 | 100.00000 |
| 17 | | 75 | | 1 | 0.05000 | 3.75000 |
| 18 | | 125 | | 1 | 0.05000 | 6.25000 |
| 19 | | 175 | | 1 | 0.05000 | 8.75000 |
| 20 | | 250 | | 1 | 0.05000 | 12.50000 |
| | | | 2.2% | 20 | | 400.00000 |

In another embodiment, the probability of selections of the different fixed awards are weighted to enable for a higher range of fixed awards to be available. In this embodiment, the weighted embodiment enables for much higher fixed awards on the wheel as well as much higher progressive start values. The following table provides an example of a probability table for the secondary bonus game, wherein the average expected value for a spin of the award generator (i.e., award wheel) is 400 credits and each slice of the award wheel has a weighted probability of being selected.

| Position | Progressive | Value | Increment | Times | Probability | Contribution |
|---|---|---|---|---|---|---|
| 1 | | 100 | | 24 | 0.07143 | 7.14286 |
| 2 | | 250 | | 18 | 0.05357 | 13.39286 |
| 3 | | 750 | | 7 | 0.02083 | 15.62500 |
| 4 | | 400 | | 22 | 0.06548 | 26.19048 |
| 5 | | 200 | | 30 | 0.08929 | 17.85714 |
| 6 | Green | 2000 | 0.6% | 10 | 0.02976 | 59.52381 |
| 7 | | 125 | | 30 | 0.08929 | 11.16071 |
| 8 | | 600 | | 13 | 0.03869 | 23.21429 |
| 9 | | 300 | | 18 | 0.05357 | 16.07143 |
| 10 | | 175 | | 23 | 0.06845 | 11.97917 |
| 11 | Red | 10000 | 0.9% | 1 | 0.00298 | 29.76190 |
| 12 | | 400 | | 18 | 0.05357 | 21.42857 |
| 13 | | 125 | | 22 | 0.06548 | 8.18452 |
| 14 | | 500 | | 12 | 0.03571 | 17.85714 |
| 15 | | 250 | | 19 | 0.05655 | 14.13690 |
| 16 | Blue | 5000 | 0.7% | 3 | 0.00893 | 44.64286 |
| 17 | | 150 | | 20 | 0.05952 | 8.92857 |
| 18 | | 350 | | 20 | 0.05952 | 20.83333 |
| 19 | | 200 | | 19 | 0.05655 | 11.30952 |
| 20 | | 1000 | | 7 | 0.02083 | 20.83333 |
| | | | 2.2% | 336 | | 400.07440 |

As seen above, each of these embodiments results in the same average expected value for the award wheel. The differences are related to the fixed awards made available to the player. In each of these embodiments, the progressive awards and the fixed awards associated with the secondary game are funded through the side wager (and not through the base game paytable). In one embodiment, the progressive increment is funded purely from the side bet. In another embodiment, all bets are qualified to increment these progressives. It should be appreciated that the progressive increment is accounted for in the total return by adding it to the percent return on the base to come up with a total return for the game.

In one embodiment, the secondary game is associated with a community award generator, such as the award generator described in U.S. Published Patent Application No. 2006/0046821, entitled "GAMING SYSTEM HAVING MULTIPLE GAMING DEVICES THAT SHARE A MULTI-OUTCOME DISPLAY". In one embodiment, at least one section or slice of the community award generator is associated with a progressive award. In this embodiment, upon the triggering of the secondary game, the community award generator simultaneously generates a separate or individual outcome associated with each of a plurality of eligible gaming devices. If the section or slice associated with a progressive award is indicated by an individual gaming device (and that gaming device is eligible to win a progressive award), the player at that gaming device is provided the associated progressive award. In one embodiment, the gaming system determines which player, if any, is provided the associated progressive award based on any suitable method.

It should be appreciated that in this embodiment, the outcomes are spatially related to one another so that a random generation of an outcome associated with one gaming device automatically generates random outcomes associated with each gaming device. Accordingly, there may be a level of player strategy in determining which gaming device (of the gaming devices associated with the community award generator) to play. That is, since the slice of the community award generator associated with the progressive prize is weighted to be indicated by certain players (i.e., players who place larger wagers as described above) and the configuration of the awards of the community award generator are fixed or set, a player may attempt to actively play at an eligible gaming machine which, according to the configuration of the awards of the community award generator, will provide a greater community award generator generated award if the larger wagering player is provided the associated progressive prize.

In one embodiment, one or more progressive awards maintained by the gaming system are associated with an outcome in the primary game. In one embodiment, the determination of when to provide such a progressive award is symbol driven based on the generation of one or more designated symbols or symbol combinations. For example, as illustrated in FIGS. 1A, 1B, the sixth progressive award 112 (identified as the primary game outcome progressive award for illustration purposes) is associated with a designated symbol combination. In this example, when the designated symbol combination is randomly generated in the primary game, the primary game outcome progressive award is provided to a player. It should be appreciated that since the determination of when to provide this progressive award is based on a probability, the amount which this progressive award is incremented to is uncapped or unlimited and thus may grow to large levels.

In one embodiment, as described above, a minimum wager level is required for a gaming machine to qualify to be selected to obtain this progressive award. In one such embodiment, this minimum wager level is the maximum wager level for the primary game in the gaming machine. Providing a gaming system wherein one or more progressive awards require a maximum wager to be eligible to win such progressive awards and one or more progressive awards do not require a maximum wager to be eligible to win such progressive awards appeals to both players who prefer to place the maximum wager to win relatively larger, less frequently hit progressive awards and players who prefer not to place the maximum wager but still want to win one or more relatively smaller, more frequently hit progressive awards.

Figure 5:
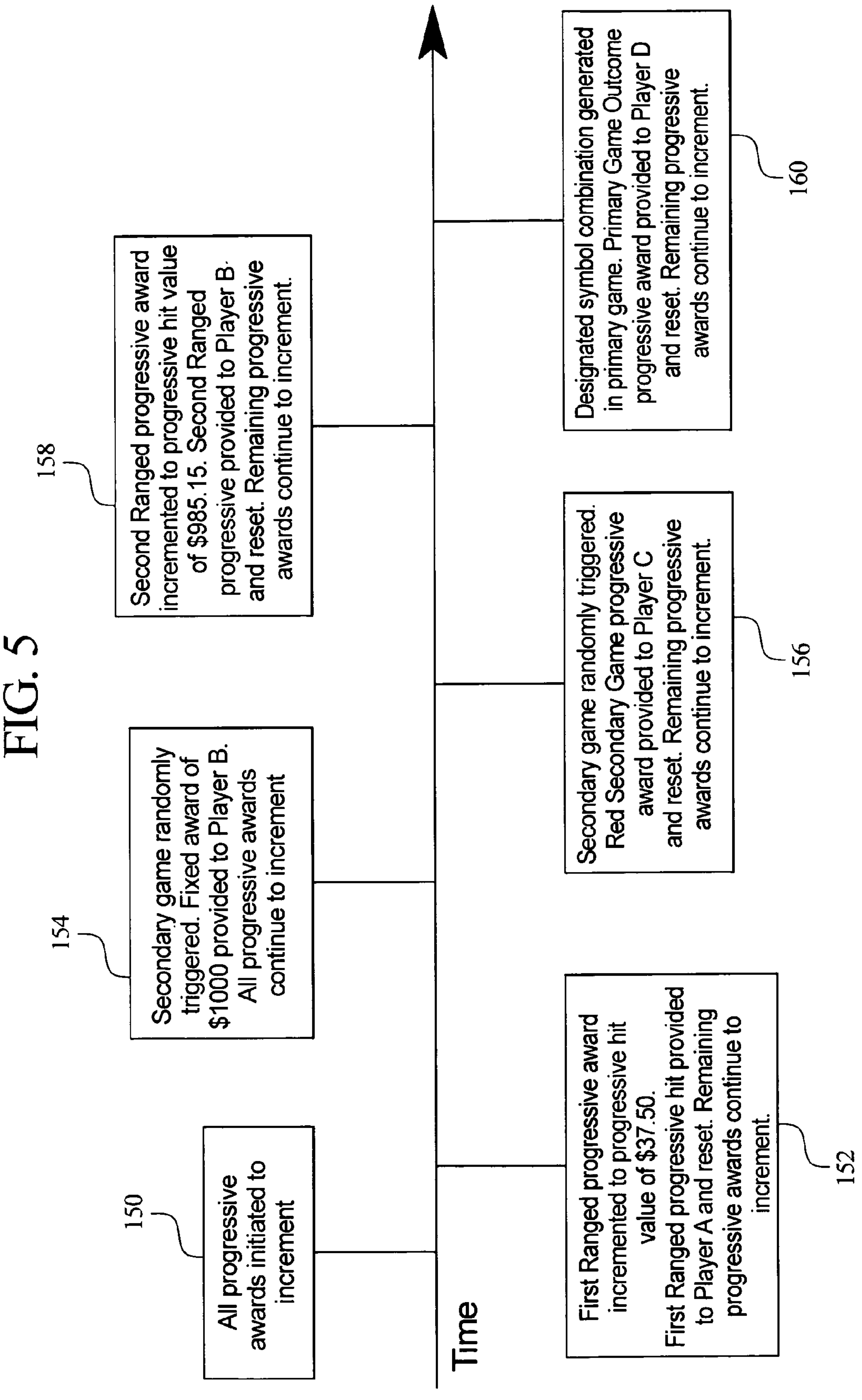
FIG. 5 is a timeline illustrating the occurrences of providing the different progressive awards to one or more of the gaming devices of the gaming system disclosed herein.

FIG. 5 illustrates a period of time wherein a plurality of different players are actively playing a plurality of gaming devices in the gaming system. In this example, as indicated in block 150, the gaming system initiates all the progressive awards to increment. As described above and as indicated in block 152, when the first ranged progressive award reaches the progressive hit value of $37.50, the first ranged progressive award is provided to a first of the players, in this example Player A, and the first ranged progressive award is suitably reset. After the first ranged progressive triggering event, as indicated in block 154, the secondary game is triggered and the triggered secondary game provides a fixed award of $1000 to a second of the players, in this example Player B. After the fixed award is provided, the secondary game is again triggered as indicated in block 156. As described above, the triggered secondary game provides the red secondary game progressive award to a third of the players, in this example Player C, and the red secondary game progressive award is suitably reset.

As indicated in block 158 of FIG. 5, when the second ranged progressive award reaches the progressive hit value of $985.15, the second ranged progressive award is provided to the second of the players, in this example Player B, and the second ranged progressive award is suitably reset. Providing a plurality of different types of awards to a player, in this case Player B, provides increased enjoyment and excitement for that player. After the second ranged progressive award is provided, as indicated in block 160, one of the gaming devices in the gaming system generates the designated symbol combination in the primary game. Accordingly, the primary game outcome progressive award is provided to a fourth one of the players, in this example Player D, and the primary game outcome progressive award is suitably reset. It should be appreciated that when one of the plurality of progressive awards (or one of the fixed awards) described above is provided to a player, the remaining progressive awards are unaffected by the triggering of the provided progressive award. As illustrated in FIG. 5, maintaining a plurality of progressive awards provides for more frequent progressive awards which breaks up the relatively long periods of time it often takes to build the progressives to the appropriate levels. Providing a plurality of different types of progressive awards which are triggered or hit at different times or based on different independent triggering events results in always or almost always having at least progressive award available that is incremented to desirable levels.

Another example of how the gaming system disclosed herein operates over time includes a first ranged progressive hitting at $24.39 and a second ranged progressive hitting at $635.91. This examples also includes a secondary game progressives hitting at a rate of 1:90 for each side bet placed and a symbol-driven progressive hitting based upon the probabilities established by the game designer in the paytable of the game. In this example, Player A is placing a side bet of five credits and is betting the maximum wager of five coins on all nine paylines (which is equivalent, as discussed above, to five side bets). In terms of coins-in (for the ranged progressives), this wager of five coins on nine paylines contributes forty-five coins to the total coins-in. In this example, if there are ten other players playing in the same "bank" as Player A and each of these ten players are also betting the maximum wager, a total of four-hundred-fifty coins is accounted for each spin (for the ease of illustrative purposes, it will be assumed that the players are all playing at the same rate). These coin-ins are allocated to the progressive at a rate of 0.1%

Accordingly, for this example, the total coin-in for each session for all of the players at the bank of gaming devices (including Player A) is 495 coins and the total contribution to the progressive is 0.495 (495×0.1%). If the first ranged progressive started a $0.00 and was set to hit at $24.39, the first ranged progressive is awarded when the 24,390$^{th}$ coin was input. At the above-described game play rate for this group of players, the first ranged progressive will be awarded in the 50$^{th}$ game session and the player in the bank who wagered the 135$^{th}$ coin of the 50$^{th}$ session is awarded the first ranged progressive award.

At the same time the above-described wagers are contributing to the first ranged progressive, such wagers are also contributing to the second ranged progressive. In this example, these wagers are contributing at the same rate of 0.1% (although it should be appreciated that a different rate may be used). As discussed above, the second ranged progressive is set to hit at $635.91. This equates to the 635,910th coin at the increment rate of 0.1% and a starting value of $0.00. At the above-described game play rate for this group of 495 coins per session, the second ranged progressive is awarded in the 1285$^{th}$ game session and the player in the bank who wagered the 330$^{th}$ coin of the 1285$^{th}$ session is awarded the second ranged progressive award.

In addition to and simultaneous with the wagers contributing to the first and second ranged progressive awards, each of the players in the group has the option to be eligible for one or more additional progressives via a secondary game. In this example, the player is required to place a side bet to be eligible to participate in the secondary game. Thus, a player who is wagering a maximum of forty-five coins on a nine-line gaming device receives five side bet credits. In this example, a probability is associated with the secondary game and each time the player places their wager, a random determination is made, based on these probabilities, whether or not the player's gaming device will enter into the secondary game. If the odds per side bet of the player entering the secondary game are 1:90, a player placing the maximum side bet wager of five credits has the odds of 1:18. Thus, approximately every eighteen games the secondary game triggers for a player placing the maximum bet. In this example, once the secondary game triggers, the player will have a chance to win a fixed award or one of three progressives awards. As described above, a probability will be associated with each of these possibilities and the player will receive the prize that is chosen randomly. It should be appreciated that by enabling the secondary game to trigger more frequently than a progressive award is actually provided, players will still experience the thrill of the secondary game, even if they do not win the relatively large progressive awards each time the secondary game is triggered.

Further, in addition to all of the progressive award opportunities associated with the game session as described above, the player is also playing for a symbol-driven progressive. This progressive is awarded based upon a winning combination occurring in a player's base game. This combination can have a specifically probability and will be chosen by the game designer to create an equal chance for all player's who are linked into the system. This progressive prize can grow to very large amounts because a game designer can set this winning symbol combination at a very small probability. One example of such a progressive is the MegaBucks™ progressive gaming system implemented by the assignee of this patent application.

Thus, for every play of the game by the player, there are a number of award opportunities available and because of the cyclical nature of the progressives there is a high probability that one will be a desirable prize to play for, thus eliminating jackpot fatigue. In other words, in the gaming system disclosed herein, there is always the chance a player can receive one or more progressives for each game played. For example, a player places an appropriate wager wherein: (a) the player's wagered coin-in matches the first ranged progressive hit value; (b) the player's wagered coin-in matches the second ranged progressive hit value; (c) the player's wager enacts the secondary game and the player is provided a progressive award associated with the triggered secondary game; and (d) the player's base game generated an outcome associated with the symbol-driven progressive. Thus, it is possible for the player to win a plurality of different types of progressive awards (in this case, four different progressive awards based on four different triggering events) at once based on a single game play.

In another embodiment, a triggering event occurs and one of the progressive awards is provided to a player (or at least one gaming device in the gaming system is provided a chance at winning one of the progressive awards in a secondary game) based on a predefined variable reaching a defined parameter threshold. For example, a progressive award triggering event occurs when the $500,000^{th}$ player has played a gaming machine associated with one of the progressive awards (ascertained from a player tracking system). In different embodiments, the predefined parameter thresholds include a length of time, a length of time after a certain dollar amount is hit, a wager level threshold for a specific machine (which gaming device is the first to contribute $250,000), a number of gaming machines active, or any other parameter that defines a suitable threshold.

In another embodiment, a triggering event occurs and one of the progressive awards is provided to a player (or at least one gaming device in the gaming system is provided a chance at winning one of the progressive awards in a secondary game) based on time. In this embodiment, a time is set for when a progressive triggering event will occur. In one embodiment, such a set time is based on historic data. For example, if previous progressives have reached $5 million after approximately sixty-seven days, a progressive award may be set to trigger sixty-seven days from when the progressive award is reset. In one embodiment, a suitable algorithm is implemented to determine the player who wagered at or closest to this time with tie-breaking based on any number of factors (e.g., player tracking history, amount of or recent wagers placed). In this embodiment, the progressive award is provided to the player who the algorithm determined wagered closest to when the progressive award is triggered. In another embodiment, one of the player who wagered during a designated time period is randomly selected and the progressive award is provided to the selected player.

In another embodiment, a triggering event occurs and one of the progressive awards is provided to a player (or at least one gaming device in the gaming system is provided a chance at winning one of the progressive awards in a secondary game) based upon gaming system operator defined player eligibility parameters stored on a player tracking system (such as via a player tracking card or other suitable manner). For example, a gaming system operator may choose to only enable players of the highest player tracking status to be eligible for a progressive award. In this embodiment, the parameters for eligibility are defined by the gaming system operator based on any suitable criterion. In one embodiment, the central controller/gaming device processor recognizes the player's identification (via the player tracking system) when the player inserts their player tracking card in the gaming machine. The central server/gaming device processor determines the player tracking level of the player and if the current player tracking level defined by the gaming system operator is eligible for the progressive award. In one embodiment, the gaming system operator defines minimum bet levels required for the progressive award based on the player's card level. In this embodiment, different bet amounts are required to be eligible to receive different progressive award levels. In another embodiment, as described above, different side bets or side-wager amounts are required to be eligible to receive different progressive award levels. Once the central controller/gaming device processor determines which players are eligible, any suitable method for awarding the progressive award may be employed.

Another embodiment for determining the winner of one or more of the progressive awards (or for determining if at least one gaming device in the gaming system is provided a chance at winning one of the progressive awards in the secondary game) includes a system determination, wherein the progressive award is provided due to a random selection by the central controller. In one embodiment, the central controller tracks all active gaming machines and the wagers they placed. Each gaming machine has its own entry defining its state as either active or inactive and also defining the values of the wagers from that gaming machine. Based on the gaming machine's state as well as one or more wager pools associated with the gaming machine, the central controller determines which of these gaming machines receives the progressive award. The player who consistently places a higher wager is more likely to receive one of the progressive awards than a player who consistently places a minimum wager.

In another embodiment, a progressive award is provided (or at least one gaming device in the gaming system is provided a chance at winning one of the progressive awards in the secondary game) by determining if any numbers allotted to a gaming device match a randomly selected number. In this embodiment, upon or prior to each play of each gaming machine, a gaming device selects a random number from a range of numbers and during each primary game, the gaming machine allocates the first N numbers in the range, where N is the number of credits bet by the player in that primary game. At the end of the primary game, the randomly selected number is compared with the numbers allocated to the player and if a match occurs, that particular gaming machine is provided all or part of one of the progressive awards.

Information Provided to Player

Figure 6:
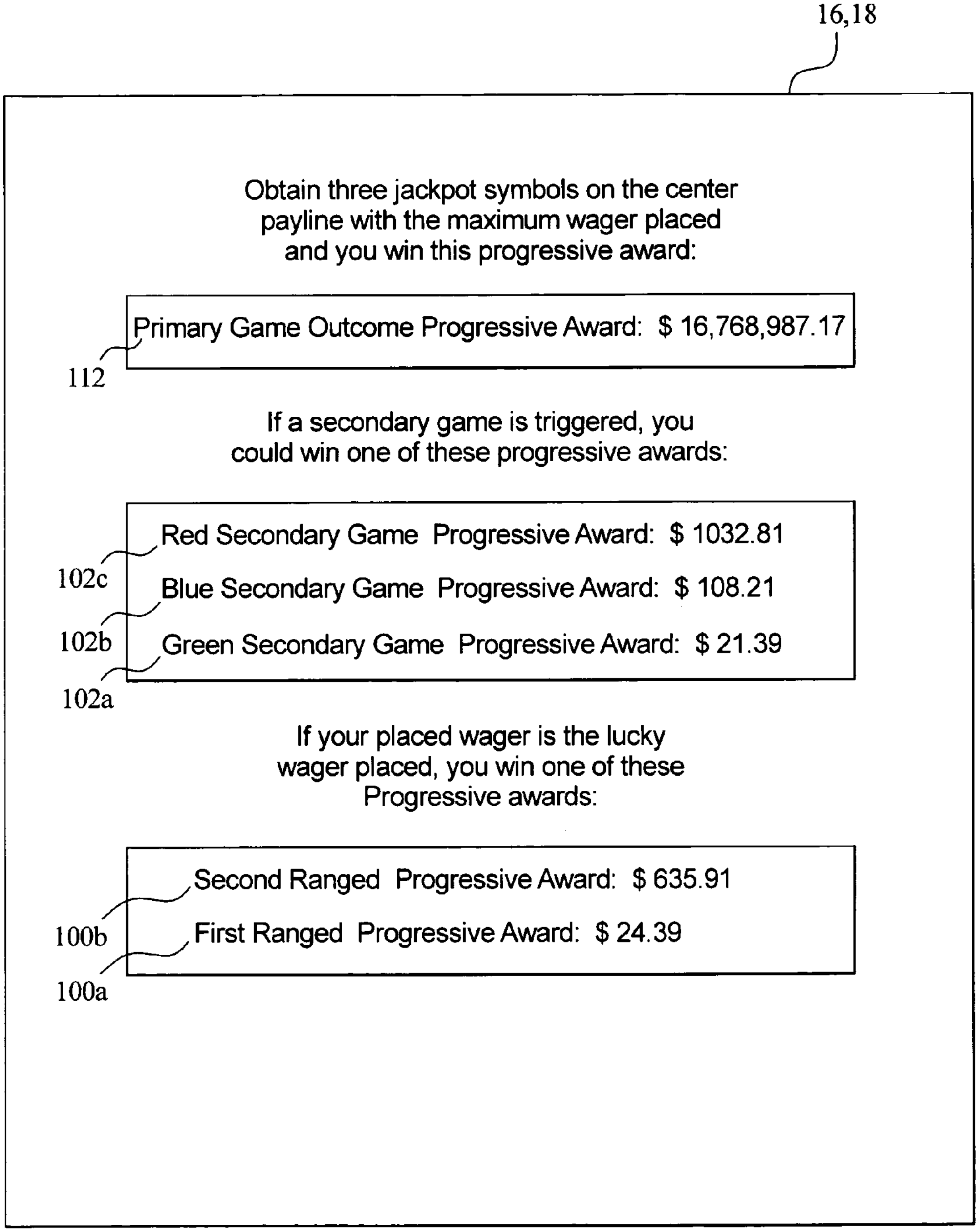
FIG. 6 is a top plan view of a display device of one embodiment of the gaming device disclosed herein illustrating the plurality of progressive awards which may be won by the player and the different criteria necessary to win such progressive awards.

As indicated above, the progressive awards may be provided to the players of the gaming machines with or without explanation or information provided to the player, or alternatively information can be displayed to the player. In one embodiment, suitable information about the progressive awards can be provided to the players through one or more displays on the gaming machines or additional information displays positioned near the gaming machines, such as above a bank of system gaming machines. FIG. 6 illustrates an example of a display of one or more of the gaming machines which displays the available progressive awards and informs the player how such progressive awards may be obtained.

This information can be used to entertain the player or inform the player that a progressive award triggering event has occurred or will occur. Examples of such information are:

(1) that a progressive award triggering event has occurred;

(2) that a progressive award triggering event will shortly occur (i.e., foreshadowing the providing of a progressive award);

(3) that one or more progressive awards have been provided to one or more players of the system gaming machines;

(4) which gaming machines have won the progressive awards;

(5) the amount of the progressive awards won;

(6) the highest progressive award won;

(7) the lowest progressive award won;

(8) the average progressive award won;

(9) number of games played/total time since the last progressive award was won;

(10) the number of progressive awards won in a designated time period; and

(11) the amount of the progressive awards that can be won; It should be appreciated that such information can be provided to the players through any suitable audio, audio-visual or visual devices.

In one embodiment, a metering and/or information display device may be used to display information regarding the different ranged progressives. In this embodiment, by informing the player of the maximum the progressives will hit at as well as other pertinent statistics, players will be more likely to feverishly play as the progressive level approaches this maximum in hopes of winning the prize. If the player does not know what this maximum is, they may have no motivation to stay or play at a faster rate.

In one example of the first ranged progressive described above, the history of the progressive may be as follows:

| Hit Value |
|---|
| $19.56 |
| $22.19 |
| $25.69 |
| $30.28 |
| $39.57 |
| $39.78 |
| $47.58 |
| $59.23 |
| $65.13 |
| $66.59 |
| $68.03 |
| $71.16 |
| $71.16 |
| $79.85 |
| $89.96 |
| $92.46 |
| $97.46 |

Statistics
Mean $57.98
Median $65.13
Mode $71.16

Figure 7:
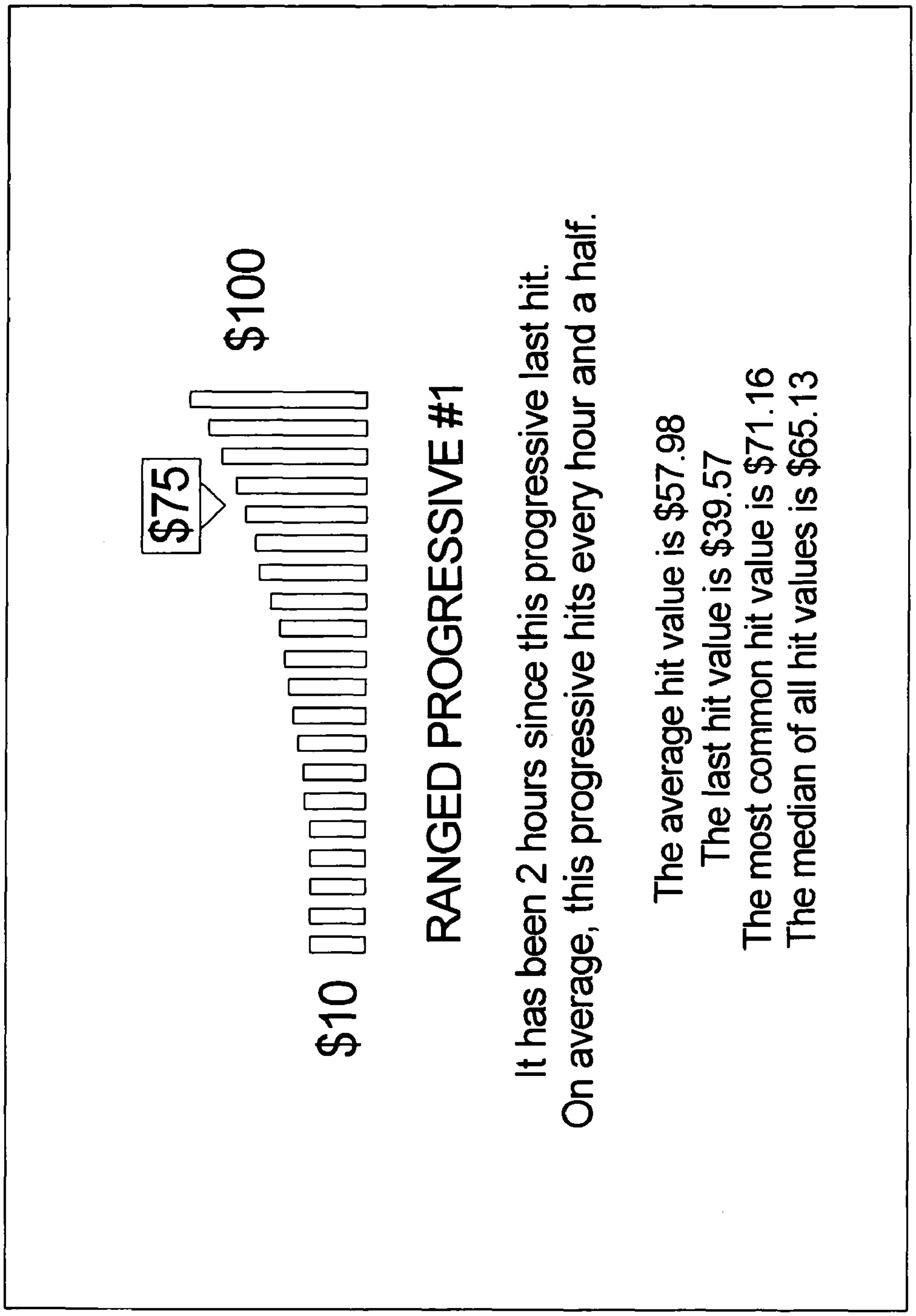
FIG. 7 is a top plan view of a display device of one embodiment of the gaming device disclosed herein illustrating information relating to one of the ranged progressive awards.

As seen in FIG. 7, the gaming device utilizes this information and displays to the player information relating to the current state of the first progressive award. In one embodiment, such information relates to the time since the progressive was hit, the average time between progressives being hit, the average hit value, the most common hit value and the median of all hit values, and/or any other suitable statistics relating to the current state of this progressive award. In one embodiment, the displayed meter uses color coding and/or different fonts when a particular statistic is in favor of the player (such as the time since the last hit being longer than the average time and the current progressive value is well above the average hit value).

By displaying this information to the player, the player feels they have a slight advantage by "being in the know." Additionally, the player is motivated to play the gaming device in all stages of the game and not just when a progressive award is incremented to a relatively large value. That is, even if the progressive award meter is low, the player is made aware of the most likely hits and the player realizes that, based on the displayed statistics, not every win is a large win. Accordingly, when the progressive meter is at the average value, the player feels the anticipation that the ranged progressive award should statistically hit very shortly. Additionally, when the progressive meter is past the average hit value, the player will play feverishly under the assumption the progressive meter most likely will hit at any moment.

Figure 8:
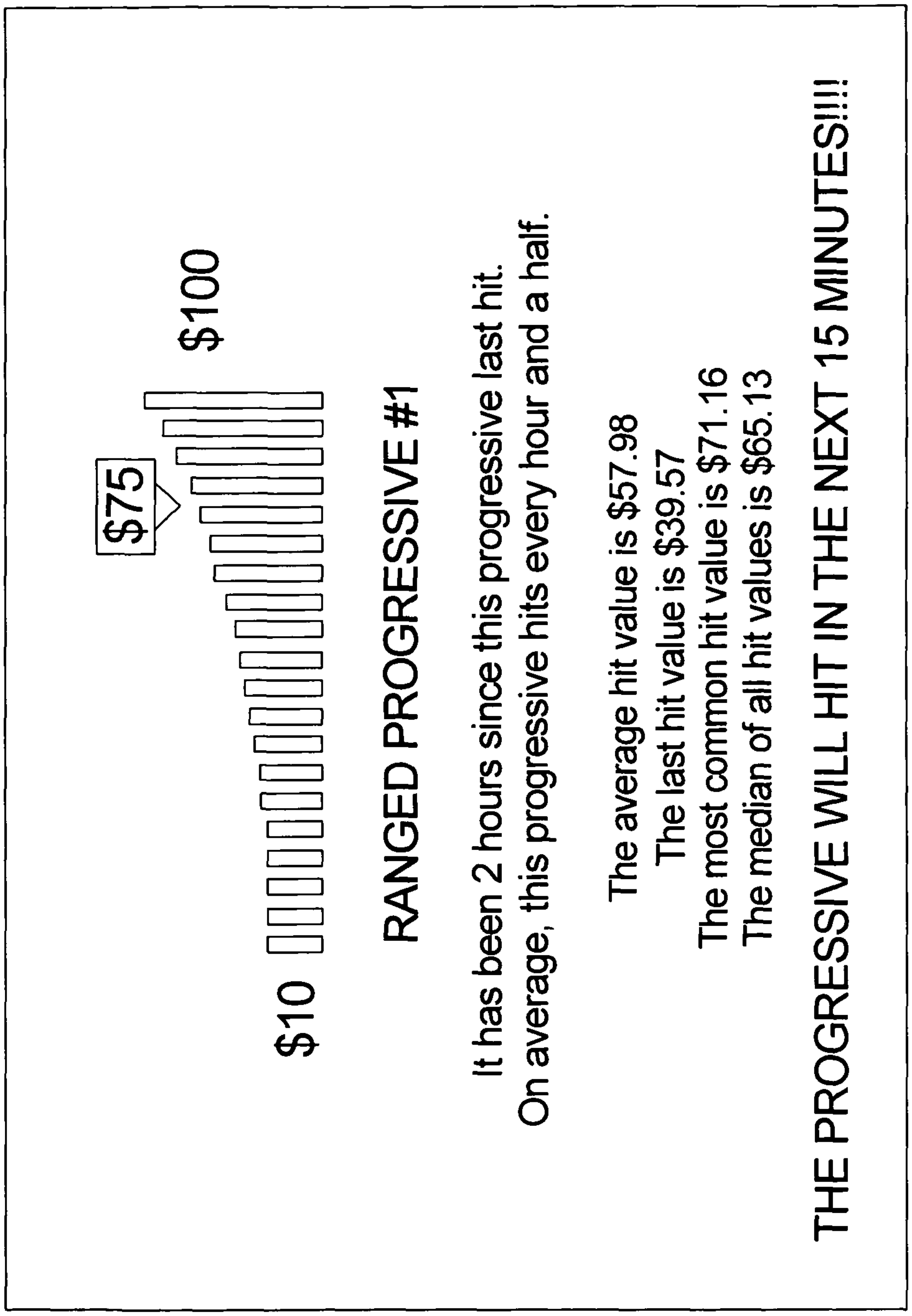
FIG. 8 is a top plan view of a display device of one embodiment of the gaming device disclosed herein illustrating information relating to the gaming system providing one of the ranged progressive awards within a designated period of time.
Figure 9:
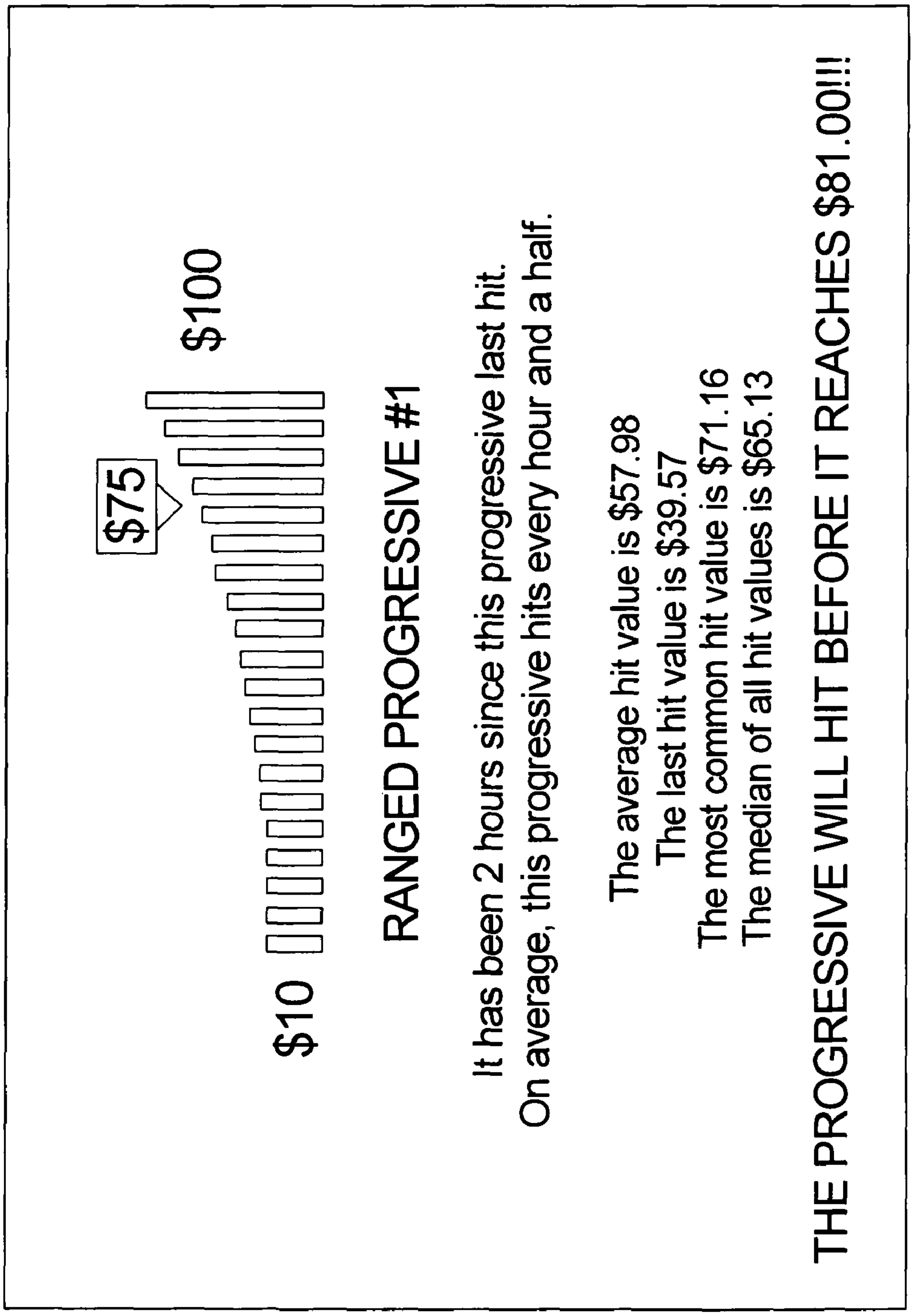
FIG. 9 is a top plan view of a display device of one embodiment of the gaming device disclosed herein illustrating information relating to the gaming system providing one of the ranged progressive awards before the progressive award increments to a designated value.

In additional embodiments wherein the controller knows when the progressive is going to hit based on the selected parameters, the gaming device displays additional information to the player regarding the potential, upcoming ranged progressive award. As illustrated in FIG. 8, the ranged progressive is determined to hit based on the selected parameter of time and the gaming device displays such information to the player. As seen in FIG. 9, the ranged progressive is determined to hit based on the selected parameter of coins-in and the gaming device displays such information to the player. By giving the player clues or hints as to when the progressive will hit, the player is encouraged to continue playing the gaming device (i.e., motivate the player to stay at the gaming machine if the ranged progressive is close to hitting) and will do so at a faster pace if the player knows that the selected winner is based on the coin-in.

In one embodiment, the gaming device displays information relating to one, more or each of the ranged progressives. Such displayed information provides the player with a wealth of information and the ability to make decisions as to the rate they wish to play. With a plurality of displayed meters offering information to the current status of a plurality of ranged progressive awards, the player is provided an increased feeling of excitement about their chances of winning one or more of the progressive awards.

In another embodiment, the gaming device displays information to the player regarding the progressive awards associated with the secondary game. In one example, this displayed information relates to: (1) how long it has been since the wheel last spun; (2) the average length of time between wheel spins; (3) how long since each of the progressives have been awarded; (4) the average amount of time between each of the progressives being awarded; (5) the last value each of the progressives hit at; and (6) the average value each of the progressives hit at. It should be appreciated that the gaming device/gaming system could display any suitable information to the player in any suitable manner.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. A gaming system comprising:

a controller configured to maintain:

(i) a first progressive award associated with a first triggering event;

(ii) a second progressive award, wherein said second progressive award is associated with a range of values and a progressive hit value; and (iii) a third progressive award, wherein said third progressive award is associated with a designated outcome of a primary game; and a plurality of gaming machines configured to communicate with the controller, said gaming machines and said controller are configured to operate to:

(a) determine if the first triggering event occurs in association with a first wager placed by a player of one of said gaming machines;

(b) if the first triggering event is determined to occur:

(i) activate an award generator to indicate one of at least one static award and the first progressive award, and (ii) provide the indicated award to one of the players of one of the gaming machines;

(c) display a non-numerical indication of a current value of the second progressive award relative to the range of values;

(d) determine if the first wager placed causes the second progressive award to reach the progressive hit value;

(e) if the first wager placed causes the second progressive award to reach the progressive hit value, provide the second progressive award to one of the players of one of the gaming machines;

(f) generate one of a plurality of outcomes of the primary game, wherein said primary game is operable upon the first wager placed, said plurality of outcomes include the designated outcome and said generation of one of the plurality of outcomes of the primary game is separate from any activation of the award generator; and (g) if the designated outcome of the primary game is generated, provide the third progressive award to one of the players of one of the gaming machines.

2. The gaming system of claim 1, which includes a plurality of first progressive awards associated with the award generator.

3. The gaming system of claim 1, which includes a plurality of static awards associated with the award generator.

4. The gaming system of claim 1, wherein said second progressive award is funded, at least in part, based on the wagers placed on the primary games of the gaming machines.

5. The gaming system of claim 1, wherein said third progressive award is funded, at least in part, based on the wagers placed on the primary games of the gaming machines.

6. The gaming system of claim 1, wherein said first progressive award is funded, at least in part, based on at least one side wager placed by at least one of the players of at least one of the gaming machines.

7. The gaming system of claim 1, wherein said static award is funded, at least in part, based on at least one side wager placed by at least one of the players of at least one of the gaming machines.

8. The gaming system of claim 1, wherein the controller is configured to maintain a plurality of second progressive awards which are each associated with a different progressive hit value.

9. The gaming system of claim 1, wherein the determination that the first triggering event will occur is independent of any displayed event in any play of any primary games of the gaming machines.

10. The gaming system of claim 1, wherein the determination that the first wager placed causes the second progressive award to reach the progressive award hit value will occur is independent of any displayed event in any play of any primary game of the gaming machines.

11. The gaming system of claim 1, wherein the determination that the third progressive award will be provided is based on an outcome associated with a designated symbol combination.

12. The gaming system of claim 1, wherein the range of values of said second progressive award is associated with the wagers placed.

13. The gaming system of claim 1, wherein the range of values of said second progressive award is associated with the progressive award value.

14. The gaming system of claim 1, wherein the range of values of said second progressive award defines a minimum value and a maximum value that can be provided to one of the players.

15. The gaming system of claim 1, wherein the gaming machines and the controller are configured to operate to display a plurality of illuminated bars in association with said non-numerical indication.

16. The gaming system of claim 1, wherein the gaming machines and the controller are configured to operate to illuminate at least one of a first set of bars, a second set of bars and a third set of bars to indicate the current value of the second progressive award relative to the range of values, wherein the third set of bars is larger than the first set of bars and the second set of bars, and the second set of bars is larger than the first set of bars.

17. A gaming device comprising:

at least one display device;

at least one input device;

at least one processor; and at least one memory device which stores a plurality of instructions, which when executed by the at least one processor, cause the at least one processor to operate with the at least one display device and the at least one input device to:

(a) enable a player to place a wager on a play of a primary game;

(b) generate an outcome for the play of the primary game;

(c) if a secondary game is triggered in association with the wager placed by the player:

(i) cause an award generator to generate one of a plurality of static awards or a first progressive award associated with the secondary game, said generation being separate from said generation of the outcome for the play of the primary game;

(ii) if one of the static awards is generated, provide said static award to the player; and (iii) if said first progressive award is generated, provide said first progressive award to the player;

(d) display a non-numerical indication of a current value of a second progressive award relative to a range of values associated with the second progressive award;

(e) if the wager placed by the player causes said second progressive award to reach a progressive hit value, provide said second progressive award to the player; and (f) if the outcome generated for the play of the primary game is associated with a third progressive award, provide the third progressive award to the player.

18. The gaming device of claim 17, wherein when executed by the at least one processor, the plurality of instructions cause the at least one processor to cause the award generator to generate one of the plurality of static awards or one of a plurality of first progressive awards associated with the secondary game if the secondary game is triggered in association with the wager placed by the player.

19. The gaming device of claim 17, wherein said first progressive award is funded, at least in part, based on at least one side wager placed by the player.

20. The gaming device of claim 17, wherein said second progressive award is funded, at least in part, based on the wagers placed on the primary game.

21. The gaming device of claim 17, wherein said third progressive award is funded, at least in part, based on the wagers placed on the primary game.

22. The gaming device of claim 17, wherein said plurality of static awards are funded, at least in part, based on at least one side wager placed by the player.

23. The gaming device of claim 17, wherein when executed by the at least one processor, the plurality of instructions cause the at least one processor to maintain a plurality of second progressive awards which are each associated with a different progressive hit value.

24. The gaming device of claim 17, wherein a determination to provide the first progressive award is independent of any displayed event in any play of any primary games of the gaming machines.

25. The gaming device of claim 17, wherein a determination to provide the second progressive award is independent of any displayed event in any play of any primary games of the gaming machines.

26. The gaming device of claim 17, wherein the outcome of the primary game associated with the third progressive award is a designated symbol combination.

27. The gaming device of claim 17, wherein the secondary game is randomly triggered.

28. The gaming device of claim 17, wherein the range of values of said second progressive award is associated with the wagers placed.

29. The gaming device of claim 17, wherein the range of values of said second progressive award is associated with the progressive award value.

30. The gaming device of claim 17, wherein the range of values of said second progressive award defines a minimum value and a maximum value that can be provided to the player.

31. The gaming device of claim 17, wherein when executed by the at least one processor, the plurality of instructions cause the at least one processor to operate with the at least one display device to display a plurality of illuminated bars in association with said non-numerical indication.

32. The gaming device of claim 17, wherein when executed by the at least one processor, the plurality of instructions cause the at least one processor to operate with the at least one display device to illuminate at least one of a first set of bars, a second set of bars and a third set of bars to indicate the current value of the second progressive award relative to the range of values, wherein the third set of bars is larger than the first set of bars and the second set of bars, and the second set of bars is larger than the first set of bars.

* * * * *